(12) United States Patent
Yan et al.

(10) Patent No.: US 11,953,732 B2
(45) Date of Patent: Apr. 9, 2024

(54) OPTICAL CROSS-CONNECT

(71) Applicant: HUAWEI TECHNOLOGIES CO., LTD., Shenzhen (CN)

(72) Inventors: Yunfei Yan, Dongguan (CN); Zhiyong Feng, Dongguan (CN); Liangjia Zong, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 912 days.

(21) Appl. No.: 16/990,129

(22) Filed: Aug. 11, 2020

(65) Prior Publication Data

US 2020/0371294 A1 Nov. 26, 2020

Related U.S. Application Data

(63) Continuation of application No. PCT/CN2018/103318, filed on Aug. 30, 2018.

(30) Foreign Application Priority Data

Feb. 13, 2018 (CN) .......................... 201810150786.3

(51) Int. Cl.
*G02B 6/35* (2006.01)
*H04J 14/02* (2006.01)
*H04Q 11/00* (2006.01)

(52) U.S. Cl.
CPC ........... *G02B 6/356* (2013.01); *G02B 6/3556* (2013.01); *H04J 14/0212* (2013.01);
(Continued)

(58) Field of Classification Search
CPC ......... H04Q 11/0005; H04Q 2011/0015; H04J 14/0212; G02B 6/356; G02B 6/3556
See application file for complete search history.

(56) References Cited

U.S. PATENT DOCUMENTS 6,842,549 B2 1/2005 So
9,158,072 B2 10/2015 Frisken et al.
(Continued)

FOREIGN PATENT DOCUMENTS

CA      2342719 A1   5/2002
CN    102696194 A    9/2012
(Continued)

OTHER PUBLICATIONS

Jia Panfeng et al., "Design of Mini 1 4 Polarization-Maintaining Optomagnetic Switch", Semiconductor Optoelectronics vol. 33 No.5, Oct. 1, 2012, total 3 pages. With an English Abstract.

*Primary Examiner* — Casey L Kretzer
(74) *Attorney, Agent, or Firm* — Rimon PC

(57) ABSTRACT

An optical cross-connect disclosed herein includes an input-end unit, an optical beam-splitting and switching unit, and an output-end unit. The input-end unit is configured to transmit a set of first light beams to the optical beam-splitting and switching unit. The optical beam-splitting and switching unit is configured to split each light beam in the set of first light beams into second light beams, to obtain a set of second light beams. The optical beam-splitting and switching unit is further configured to: perform optical path deflection on each light beam in the set of second light beams based on a preset optical-path offset parameter set, and transmit, to the output-end unit, the deflected second light beams. The output-end unit is configured to output the set of second light beams.

16 Claims, 17 Drawing Sheets

(52) U.S. Cl.
CPC . *H04Q 11/0005* (2013.01); *H04Q 2011/0015* (2013.01); *H04Q 2011/0035* (2013.01)

(56) References Cited

U.S. PATENT DOCUMENTS

| | | |
|---|---|---|
| 9,432,750 B1 | 8/2016 | Li |
| 9,742,520 B1 | 8/2017 | Way et al. |
| 2013/0209030 A1 | 8/2013 | Colbourne |
| 2014/0147121 A1 | 5/2014 | Matsukawa |
| 2017/0019168 A1* | 1/2017 | Menard ............... H04J 14/0212 |
| 2018/0143508 A1* | 5/2018 | Uetsuka ................... G02F 1/31 |
| 2019/0238251 A1* | 8/2019 | Chedore ............ H04Q 11/0005 |
| 2019/0305870 A1* | 10/2019 | Aida ....................... H04B 10/03 |
| 2019/0327015 A1* | 10/2019 | Schimpe .............. G02B 6/2931 |
| 2020/0073054 A1* | 3/2020 | Yang .................... G02B 6/3558 |

FOREIGN PATENT DOCUMENTS

| | | |
|---|---|---|
| CN | 103185970 A | 7/2013 |
| WO | 2017008208 A1 | 1/2017 |
| WO | 2017020197 A1 | 2/2017 |
| WO | 2017088115 A1 | 6/2017 |

* cited by examiner

US 11,953,732 B2

OPTICAL CROSS-CONNECT

CROSS-REFERENCE TO RELATED APPLICATIONS

This application is a continuation of International Application No. PCT/CN2018/103318, filed on Aug. 30, 2018, which claims priority to Chinese Patent Application No. 201810150786.3, filed on Feb. 13, 2018. The disclosures of the aforementioned applications are hereby incorporated by reference in their entireties.

TECHNICAL FIELD

This application relates to the optical communications field, and in particular, to an optical cross-connect.

BACKGROUND

With a rapid increase of network traffic and bandwidth, operators impose increasingly urgent requirements on intelligent scheduling functions of bottom-layer wavelength division networks. In this case, reconfigurable optical add-drop multiplexers (ROADM) are gradually used by networks of more high-end operators. After a ROADM node is introduced, service reconfiguration may be performed on a network line. In addition, a service may be further added or dropped on the node by designing an adding or dropping module on a client side of the ROADM. Therefore, a ROADM node is usually divided into a line side and a client side. Line-side and client-side adding or dropping modules are usually remotely configured by using a network management system, to provide a remote control and reconfiguration capability for the node. This implements intelligent wavelength-level service scheduling of the node.

Service adding or dropping on the ROADM node mainly include three features: colorless, directionless, and contentionless. A CDC ROADM satisfying all of the three features is one of future development directions. In the prior art, a CDC ROADM architecture is generally as follows: A line side uses a plurality of 1×N WSSs wavelength selective switch) to implement subwavelength scheduling in different dimensions, and a client side uses an N×M MCS (multi-cast switch) to implement a wavelength adding or dropping functions. Some ports of the 1×N WSSs are connected to other line sides and other ports are configured to connect to client-side added and dropped wavelengths. The N×M MCS module implements a sub-wavelength dropping function by using broadcasting and wavelength selection functions.

As shown in FIG. 1, in the prior art, an N×M MCS module includes two parts: N 1×M beam splitters and M 1×N optical switches. A light beam incident from an input port is split by a beam splitter into M sub signal light beams with equal power, and the sub signal light beams are transmitted to the M 1×N optical switches respectively (FIG. 1 shows only light beams from two input ports). Each optical switch selects one sub light beam from N sub light beams that are from N beam splitters and transmits the selected sub light beam to an output end, and shields other (N−1) sub light beams. The beam splitter part is the cause that the N×M MCS module suffers a great loss. Considering wavelength adding or dropping link power budgets of a ROADM, a maximum of 16 output ports are supported. Because of a limited quantity of output ports of the MCS module, a plurality of MCS modules need to be used on the ROADM node. In addition, because a loss of the MCS module is relatively great, an optical amplifier array needs to be added between a line side and a client side. If a noncoherent reception module is used as a client-side reception module, an additional tunable filter array is required. Consequently, an MCS-based CDC ROADM is relatively large in size and high in cost.

SUMMARY

Embodiments of this application provide an optical cross-connect, to reduce a size of a ROADM and reduce costs.

To achieve the foregoing objective, the following technical solutions are used in the embodiments of this application.

According to a first aspect, an optical cross-connect is provided, including: an input-end unit, an optical beam-splitting and switching unit, and an output-end unit. The input-end unit includes M input ports, and is configured to transmit first light beams whose optical paths do not overlap and that are in a set of first light beams to the optical beam-splitting and switching unit. The set of first light beams includes M first light beams. The optical beam-splitting and switching unit is configured to split each first light beam in the set of first light beams into $Q_i$ second light beams, to obtain a set of second light beams, where the set of second light beams includes Z second light beams, the Z second light beams include M groups of second light beams, and each group of second light beams corresponds to one first light beam and includes $Q_i$ second light beams; and $i \in [1, M]$, $Z = Q_1 + Q_2 + \ldots + Q_M$, $Q_i \geq 1$, and at least one value of $Q_i$ is greater than or equal to 2. The optical beam-splitting and switching unit is further configured to: perform optical path deflection on each group of second light beams in the set of second light beams based on a preset optical-path offset parameter set, and transmit, to the output-end unit, the second light beams that are in the set of second light beams and that are deflected, where an $N^{th}$ group of offset parameters in the optical-path offset parameter set is used to perform optical path deflection on an $N^{th}$ group of second light beams in the set of second light beams, so that all second light beams in the $N^{th}$ group of second light beams are deflected and then output to $Q_N$ output ports of the output-end unit in a one-to-one correspondence manner, where $N \in [1, M]$. The output-end unit includes Z output ports, and is configured to output the set of second light beams. In the foregoing solution, the optical beam-splitting and switching unit separately splits, at a ratio of $1:Q_i$, the M first light beams output from the M input ports, and switches each second light beam in the second Z light beams obtained by splitting to any one of the Z output ports. In the same beam-splitting ratio, more output ports can be provided. When a same quantity of output ports are provided, a beam-splitting ratio can be decreased, and a loss caused by beam splitting can be decreased. In this way, a size and costs of the optical cross-connect can be reduced.

In an example, the optical beam-splitting and switching unit includes a first optical beam-splitting and switching module and a second optical switching module, and the first optical beam-splitting and switching module includes an optical beam-splitting module and a first optical switching module. The optical beam-splitting module is configured to: split, into $Q_i$ second light beams, a first light beam that is transmitted from each input port and that is in the set of first light beams; and transmit, to the first optical switching module, the $Q_i$ second light beams obtained by splitting each first light beam. The first optical switching module is configured to deflect respectively, based on $Q_i$ first deflection angles corresponding to each of the M input ports, direction angles of $Q_i$ second light beams obtained by splitting a first light beam transmitted from the corresponding input port, so that the $Q_i$ second light beams that are deflected and that correspond to each of the M input ports are separately output to the second optical switching module. $Q_i$ first deflection angles corresponding to one input port are in a one-to-one correspondence with the $Q_i$ second light beams obtained by splitting the first light beam transmitted by the input port. The second optical switching module is configured to deflect, again based on $Q_i$ second deflection angles corresponding to each of the M input ports, direction angles of the received $Q_i$ second light beams that are deflected and that correspond to each of the M input ports, so that each second light beam that is deflected again is output to a corresponding output port of the output-end unit. $Q_i$ second deflection angles corresponding to one input port are in a one-to-one correspondence with $Q_i$ second light beams obtained by splitting a first light beam transmitted by the input port. For any $N^{th}$ input port, $Q_N$ first deflection angles and $Q_N$ second deflection angles that correspond to the $N^{th}$ input port are determined based on an $N^{th}$ group of offset parameters in the optical-path offset parameter set. In this solution, the optical beam-splitting module splits the first light beam at a ratio of $1:Q_i$, and the first optical switching module separately deflects the $Q_i$ second light beams to corresponding locations of the second optical switching module based on the $Q_i$ first deflection angles; and the second optical switching module separately deflects the $Q_i$ deflected second light beams into the $Q_i$ different output ports based on the $Q_i$ second deflection angles. In this way, one input port corresponds to $Q_i$ output ports, and M input ports correspond to $(Q_1+Q_2+ \ldots +Q_M)$ output ports. For a same beam-splitting ratio, compared with a solution in the prior art, in this embodiment, more output ports can be provided, and a size of the optical cross-connect is reduced.

In an example, the optical beam-splitting module includes M input areas and M output areas that are in a one-to-one correspondence with the M input areas. The first optical switching module includes M deflection areas, the second optical switching module includes Z deflection areas, the Z deflection areas of the second optical switching module include M deflection area groups, and each deflection area group includes $Q_i$ deflection areas. The M input areas of the optical beam-splitting module are configured to receive the M first light beams in the set of first light beams respectively, and an $X^{th}$ output area of the optical beam-splitting module is configured to output $Q_X$ second light beams obtained by splitting an $X^{th}$ first light beam, where $X \in [1, M]$. The M output areas of the optical beam-splitting module are in a one-to-one correspondence with the M deflection areas of the first optical switching module; the M deflection areas of the first optical switching module are in a one-to-one correspondence with the M deflection area groups of the second optical switching module; and the Z deflection areas of the second optical switching module are in a one-to-one correspondence with the Z output ports of the output-end unit. The $Q_N$ first deflection angles that correspond to the $N^{th}$ input port and that are determined based on the $N^{th}$ group of offset parameters in the optical-path offset parameter set are used, so that $Q_N$ second light beams that are deflected and that are output from an $N^{th}$ deflection area of the first optical switching module correspond to $Q_N$ deflection areas from an $N^{th}$ deflection area group of the second optical switching module; and the $Q_N$ second deflection angles that correspond to the $N^{th}$ input port and that are determined based on the $N^{th}$ group of offset parameters in the optical-path offset parameter set are used, so that $Q_N$ second light beams that are deflected again and that are output from the $N^{th}$ deflection area group of the second optical switching module are in a one-to-one correspondence with the $Q_N$ output ports of the output-end unit. In this solution, a preset correspondence may be implemented between the input area of the optical beam-splitting module, the output area of the optical beam-splitting module, the deflection area of the first optical switching module, and the deflection area of the second optical switching module based on the first deflection angle and the second deflection angle, so that a light beam of an input port is deflected to a destination output port by a preset angle. In this way, M input ports correspond to Z output ports.

In an example, input directions of the input ports of the input-end unit are set in parallel along a first direction angle, output directions of the output ports of the output-end unit are set in parallel along a second direction angle, and the first direction angle is the same as the second direction angle. Each reflection area of the first optical beam-splitting and switching module is located on a first plane, a horizontal included angle and a vertical included angle between the first plane and the first direction angle are a first horizontal deviation angle and a first vertical deviation angle respectively, and the first horizontal deviation angle and the first vertical deviation angle are determined based on the first direction angle, the second direction angle, and a relative location of the input-end unit relative to the output-end unit; and each reflection area of the second optical switching module is located on a second plane, and a horizontal included angle and a vertical included angle between the second plane and the second direction angle are a second horizontal deviation angle and a second vertical deviation angle respectively, and the second horizontal deviation angle and the second vertical deviation angle are determined based on the first direction angle, the second direction angle, and the relative location of the input-end unit relative to the output-end unit. The second plane is parallel to the first plane. In this solution, the first optical beam-splitting and switching module and the second optical switching module are disposed in parallel, and angles of disposing the first optical beam-splitting and switching module and the second optical switching module may be adjusted based on an input direction of an input port of the input-end unit and an output direction of an output port of the output-end unit. In this way, regardless of a direction of an input port or an output port, a light beam input from the input port may be output to the output port in a predetermined direction. In addition, the input direction of the input port of the input-end unit and the output direction of the output port of the output-end unit may be flexibly adjusted based on an actual requirement, to meet requirements of various application scenarios. In addition, a deflection action surface of each deflection area of the first optical switching module is provided facing the input-end unit, and a deflection action surface of each deflection area of the second optical switching module is provided facing the output-end unit. In this way, the first optical switching module and the second optical switching module can effectively deflect a light beam.

In an example, the optical beam-splitting and switching unit further includes an optical-path conversion module; the optical-path conversion module is one or more lenses, is disposed parallel to the first plane, and is disposed on an optical path through which the set of second light beams is transmitted from the first optical beam-splitting and switching module to the second optical switching module. An equivalent center of the optical-path conversion module is located on a connection line between a center of the first optical beam-splitting and switching module and a center of the second optical path switching module, an interval between the optical-path conversion module and the first optical beam-splitting and switching module is an equivalent focal length of the optical-path conversion module, and an interval between the optical-path conversion module and the second optical switching module is an equivalent focal length of the optical-path conversion module. The center of the first optical beam-splitting and switching module is a center of the M deflection areas of the first optical switching module, and the center of the second optical switching module is a center of the Z deflection areas of the second optical switching module. In this solution, the optical-path conversion module is disposed, so that the deflection angle of the first optical beam-splitting and switching module can be fully and effectively used, thereby improving utilization of the deflection angle. In addition, an optical-path conversion module is disposed according to a preset location, so that an entire optical path is strictly symmetric with the optical-path conversion module as a center, thereby reducing a coupling loss. Therefore, an energy loss is further reduced, and a size of the entire optical cross-connect is reduced.

In an example, a first collimation-lens array is disposed between the input-end unit and the optical beam-splitting and switching unit, and a second collimation-lens array is disposed between the optical beam-splitting and switching unit and the output-end unit. In this solution, the first collimation-lens array is disposed, so that a light beam input from an input port may be collimated into a group of light beams that are approximately parallel. In this way, it is more convenient for the optical beam-splitting and switching unit to deflect a direction angle of a light beam, and a method for calculating the first deflection angle and the second deflection angle is simpler. The second collimation-lens array may correspondingly output a group of parallel light beams to respective output ports. In another implementation, an interval between the first optical beam-splitting and switching module and the first collimation-lens array is set as a collimator distance of the first collimation-lens array, so that a waist of a light spot of each first light beam is mapped onto a surface of the first optical beam-splitting and switching module. In this case, a light spot, of a light beam output from the first collimation-lens array, on the first optical beam-splitting and switching module is smallest, reducing a loss caused by dispersed light beams. Similarly, an interval between the second optical switching module and the second collimation-lens array is set as a collimator distance of the second collimation-lens array.

In an example, the first optical beam-splitting and switching module may be a micro-electromechanical system MEMS, a digital light processor DLP, or a beam splitter and an optical switching unit.

In an example, an offset parameter in the optical-path offset parameter set includes at least one of a location of an input port, a location of an output port, and a location of an optical beam-splitting and switching unit.

According to a second aspect, a reconfigurable optical add-drop multiplexer is provided, including a wavelength selective switch WSS and at least one of the optical cross-connects according to any one of the first aspect or the feasible implementations. In the foregoing solution, the optical cross-connect has a small loss and a large quantity of output ports, so that a size of the reconfigurable optical add-drop multiplexer can be effectively reduced, and costs of the reconfigurable optical add-drop multiplexer can be reduced.

According to a third aspect, an optical cross-connect is provided, including an input-end unit, a polarization splitting apparatus, a first polarization conversion apparatus, a polarization-dependent optical beam-splitting and switching unit, a second polarization conversion apparatus, a polarization combining apparatus, and an output-end unit. The input-end unit includes M input ports, the input-end unit is configured to transmit first light beams in a set of first light beams to the polarization splitting apparatus, and the set of first light beams includes M first light beams. The polarization splitting apparatus is configured to: perform polarization splitting on each first light beam in the set of first light beams to obtain a set of third light beams and a set of fourth light beams, where an $X^{th}$ third light beam in the set of third light beams is a light beam component that is in a first polarization state and that is of an $X^{th}$ first light beam in the set of first light beams, and an $X^{th}$ fourth light beam in the set of fourth light beams is a light beam component that is in a second polarization state and that is of the $X^{th}$ first light beam in the set of first light beams; transmit each third light beam in the set of third light beams to the polarization-dependent optical beam-splitting and switching unit; and transmit each fourth light beam in the set of fourth light beams to the first polarization conversion apparatus; where $X \in [1, M]$. The first polarization conversion apparatus is configured to: perform polarization state conversion on each fourth light beam in the set of fourth light beams to obtain a set of fifth light beams, where each fifth light beam in the set of fifth light beams is in the first polarization state; and output each fifth light beam in the set of fifth light beams to the polarization-dependent optical beam-splitting and switching unit. The polarization-dependent optical beam-splitting and switching unit is configured to split each third light beam in the set of third light beams into $Q_1$ sixth light beams, to obtain a set of sixth light beams, where the set of sixth light beams includes Z sixth light beams, the Z sixth light beams include M groups of sixth light beams, and each group of sixth light beams corresponds to one third light beam and includes $Q_1$ sixth light beams; and $i \in [1, M]$, $Z=Q_1+Q_2+ \ldots +Q_M$, $Q_i >= 1$, and at least one value of $Q_i$ is greater than or equal to 2. The polarization-dependent optical beam-splitting and switching unit is further configured to: perform optical path deflection on each group of sixth light beams in the set of sixth light beams based on a preset first optical-path offset parameter set, and transmit, to the polarization combining apparatus, the Z sixth light beams that are in the set of sixth light beams and that are deflected. An $N^{th}$ group of offset parameters in the first optical-path offset parameter set is used to perform optical path deflection on an $N^{th}$ group of sixth light beams in the set of sixth light beams, so that each sixth light beam in the $N^{th}$ group of sixth light beams is deflected and transmitted to the polarization combining apparatus, where $N \in [1, M]$. The polarization-dependent optical beam-splitting and switching unit is further configured to split each fifth light beam in the set of fifth light beams into $Q_i$ seventh light beams, to obtain a set of seventh light beams, where the set of seventh light beams includes Z seventh light beams, the Z seventh light beams include M groups of seventh light beams, and each group of seventh light beams corresponds to one fifth light beam and includes $Q_i$ seventh light beams. The polarization-dependent optical beam-splitting and switching unit is further configured to: perform optical path deflection on each group of seventh light beams in the set of seventh light beams based on a preset second optical-path offset parameter set, and transmit, to the second polarization conversion apparatus, the Z seventh light beams that are in the set of seventh light beams and that are deflected. An $N^{th}$ group of offset parameters in the second optical-path offset parameter set is used to perform optical path deflection on an $N^{th}$ group of seventh light beams in the set of seventh light beams, so that the seventh light beams in the $N^{th}$ group of seventh light beams are transmitted to the second polarization conversion apparatus in a one-to-one correspondence manner after being deflected, where $N \in [1, M]$. The second polarization conversion apparatus is configured to: perform polarization state conversion on the M groups of seventh light beams in the set of seventh light beams to obtain a set of eighth light beams, where each eighth light beam in the set of eighth light beams is in the second polarization state; and output each group of eighth light beams in the set of eighth light beams to the polarization combining apparatus. The polarization combining apparatus is configured to: perform polarization combining on the Z sixth light beams in the set of sixth light beams and Z eighth light beams in the set of eighth light beams to obtain the set of second light beams; and transmit each second light beam in the set of second light beams to the output-end unit. The output-end unit includes Z output ports, and is configured to output the set of second light beams. In the foregoing solution, the polarization-dependent optical beam-splitting and switching unit separately splits, at a ratio of $1:Q_i$, the M first light beams output from the M input ports, and switches each of Z light beams obtained by splitting to any one of the Z output ports. In the same beam-splitting ratio, more output ports can be provided. When a same quantity of output ports are provided, a beam-splitting ratio can be decreased, and a loss caused by beam splitting can be decreased. In this way, a size and costs of the optical cross-connect can be reduced. In addition, with the polarization splitting apparatus, the first polarization conversion apparatus, and the second polarization conversion apparatus disposed, an input light beam can be polarized into a polarization state that the polarization-dependent optical beam-splitting and switching unit can act on, so that the polarization-dependent optical beam-splitting and switching unit works normally; and with the polarization combining apparatus, two light beams in different polarization states may be combined into one light beam in a non-polarized state, so that states of an input light beam and an output light beam are consistent.

In an example, the polarization-dependent optical beam-splitting and switching unit includes a first optical beam-splitting and switching apparatus and a second optical switching apparatus, the first optical beam-splitting and switching apparatus includes a first optical beam-splitting submodule, a second optical beam-splitting submodule, a first optical switching submodule, and a second optical switching submodule, and the second optical switching apparatus includes a third optical switching submodule and a fourth optical switching submodule. The first optical beam-splitting submodule is configured to: split, into $Q_i$ sixth light beams, each third light beam that corresponds to each input port and that is in the set of third light beams; and separately transmit, to the first optical switching submodule, the $Q_i$ sixth light beams obtained by splitting each third light beam. The second optical beam-splitting submodule is configured to: split, into $Q_i$ seventh light beams, each fifth light beam that corresponds to each input port and that is in the set of fifth light beams; and separately transmit, to the second optical switching submodule, $Q_i$ seventh light beams obtained by splitting each fifth light beam. The first optical switching submodule is configured to: deflect respectively, based on $Q_i$ first deflection angles corresponding to each of the M input ports, direction angles of $Q_i$ sixth light beams obtained by splitting a third light beam corresponding to the corresponding input port, so that the $Q_i$ sixth light beams that are deflected and that correspond to each of the M input ports are separately output to the third optical switching submodule. $Q_i$ first deflection angles corresponding to one input port are in a one-to-one correspondence with the $Q_i$ sixth light beams obtained by splitting the third light beam corresponding to the input port. The second optical switching submodule is configured to deflect respectively, based on $Q_i$ second deflection angles corresponding to each of the M input ports, direction angles of $Q_i$ seventh light beams obtained by splitting a fifth light beam corresponding to the corresponding input port, so that the $Q_i$ seventh light beams that are deflected and that correspond to each of the M input ports are separately output to the fourth optical switching submodule. $Q_i$ second deflection angles corresponding to one input port are in a one-to-one correspondence with the $Q_i$ seventh light beams obtained by splitting the fifth light beam corresponding to the input port. The third optical switching submodule is configured to: deflect respectively, again based on $Q_i$ third deflection angles corresponding to each of the M input ports, direction angles of the received $Q_i$ sixth light beams that are deflected and that correspond to each of the M input ports, so that the sixth light beams that are deflected again are separately output to the polarization combining apparatus. $Q_i$ third deflection angles corresponding to one input port are in a one-to-one correspondence with the $Q_i$ sixth light beams obtained by splitting the third light beam corresponding to the input port. The fourth optical switching submodule is configured to: deflect, again based on $Q_i$ fourth deflection angles corresponding to each of the M input ports, direction angles of the received $Q_i$ seventh light beams that are deflected and that correspond to each of the M input ports, so that the seventh light beams that are deflected again are separately output to the second polarization conversion apparatus. $Q_i$ fourth deflection angles corresponding to one input port are in a one-to-one correspondence with the $Q_i$ seventh light beams obtained by splitting the fifth light beam corresponding to the input port. For any $N^{th}$ input port, $Q_N$ first deflection angles and $Q_N$ third deflection angles that correspond to the $N^{th}$ input port are determined based on the $N^{th}$ group of offset parameters in the first optical-path offset parameter set; and $Q_N$ second deflection angles and $Q_N$ fourth deflection angles that correspond to the $N^{th}$ input port are determined based on the $N^{th}$ group of offset parameters in the second optical-path offset parameter set. In this solution, the first optical beam-splitting and switching apparatus splits M light beams at a ratio of $1:Q_1$, and separately deflects each light beam in Z light beams to the second optical switching apparatus; and the second optical switching apparatus separately deflects $Q_i$ second light beams corresponding to one light beam to the $Q_i$ different output ports by a preset deflection angle. In this way, one input port corresponds to $Q_1$ output ports, and M input ports correspond to $(Q_1+Q_2+\ldots+Q_M)$ output ports. For a same beam-splitting ratio, compared with a solution in the prior art, in this embodiment, more output ports can be provided, and a size of the optical cross-connect is reduced. The first optical beam-splitting and switching apparatus includes the first optical beam-splitting submodule, the second optical beam-splitting submodule, the first optical switching submodule, and the second optical switching submodule, and the second optical switching apparatus includes the third optical switching submodule and the fourth optical switching submodule. Each apparatus is divided into two different submodules, and the two different submodules may correspondingly process a light beam in the first polarization state, and correspond to a function of the polarization splitting apparatus.

In an example, a first deflection angle corresponding to a $Y^{th}$ sixth light beam in $Q_X$ sixth light beams obtained by splitting an $X^{th}$ third light beam is the same as a second deflection angle corresponding to a $Y^{th}$ seventh light beam in $Q_X$ seventh light beams obtained by splitting an $X^{th}$ fifth light beam, and a third deflection angle corresponding to the $Y^{th}$ sixth light beam in the $Q_X$ sixth light beams obtained by splitting the $X^{th}$ third light beam is the same as a fourth deflection angle corresponding to the $Y^{th}$ seventh light beam in the $Q_X$ seventh light beams obtained by splitting the $X^{th}$ fifth light beam. $Y \in [1, Q_X]$. In this solution, a correspondence between the first deflection angle and the second deflection angle and a correspondence between the third deflection angle and the fourth deflection angle can make the polarization combining apparatus to combine components, in the two polarization states, of one light beam into one light beam.

In an example, the polarization splitting apparatus includes M polarization splitting input location areas, M first polarization splitting output location areas that are in a one-to-one correspondence with the M polarization splitting input location areas, and M second polarization splitting output location areas that are in a one-to-one correspondence with the M polarization splitting input location areas. The first optical beam-splitting submodule includes M input areas and M output that are in a one-to-one correspondence with the M input areas. The second optical beam-splitting submodule includes M input areas and M output areas that are in a one-to-one correspondence with the M input areas. The first polarization conversion apparatus includes M conversion location areas; and the second polarization conversion apparatus includes Z conversion location areas. The first optical switching submodule and the second optical switching submodule each include M deflection areas. The third optical switching submodule and the fourth optical switching submodule each include Z deflection areas, the Z deflection areas include M deflection area groups, and each deflection area group includes $Q_i$ deflection areas. The polarization combining apparatus includes Z polarization combining output location areas, Z first polarization combining input location areas that are in a one-to-one correspondence with the Z polarization combining output location areas, and Z second polarization combining input location areas that are in a one-to-one correspondence with the Z polarization combining output location areas. The polarization splitting apparatus is configured to: receive the M first light beams in the set of first light beams from M polarization splitting input location areas respectively in a one-to-one correspondence manner, and output respectively M third light beams by using corresponding first polarization splitting output location areas, and output respectively M fourth light beams by using corresponding second polarization splitting output location areas. The M input areas of the first optical beam-splitting submodule are used to receive M third light beams respectively, and an $X^{th}$ output area of the first optical beam-splitting submodule is used to output $Q_X$ sixth light beams obtained by splitting the $X^{th}$ third light beam. The M input areas of the second optical beam-splitting submodule are used to receive M fifth light beams respectively, and an $X^{th}$ output area of the second optical beam-splitting submodule is used to output $Q_X$ seventh light beams obtained by splitting an $X^{th}$ fifth light beam. $X \in [1, M]$. The polarization combining apparatus is configured to: receive the Z sixth light beams in the set of sixth light beams from the Z first polarization combining input location areas respectively in a one-to-one correspondence manner, receive the Z eighth light beams in the set of eighth light beams from the Z second polarization combining input location areas respectively in a one-to-one correspondence manner, and output the Z second light beams from the corresponding Z polarization combining output location areas respectively. The M input areas of the first optical beam-splitting submodule are in a one-to-one correspondence with the M first polarization splitting output location areas of the polarization splitting apparatus, the M input areas of the second optical beam-splitting submodule are in a one-to-one correspondence with the M conversion location areas of the first polarization conversion apparatus, and the M conversion location areas of the first polarization conversion apparatus are in a one-to-one correspondence with the M second polarization splitting output location areas of the polarization splitting apparatus. The M output areas of the first optical beam-splitting submodule are in a one-to-one correspondence with the M deflection areas of the first optical switching submodule, and the M output areas of the second optical beam-splitting submodule are in a one-to-one correspondence with the M deflection areas of the second optical switching submodule. The M deflection areas of the first optical switching submodule are in a one-to-one correspondence with the M deflection area groups of the third optical switching submodule, and the M deflection areas of the second optical switching submodule are in a one-to-one correspondence with the M deflection area groups of the fourth optical switching submodule. The Z deflection areas of the third optical switching submodule are in a one-to-one correspondence with the Z first polarization combining input location areas of the polarization combining apparatus, the Z deflection areas of the fourth optical switching submodule are in a one-to-one correspondence with the Z conversion location areas of the second polarization conversion apparatus, and the Z conversion location areas of the second polarization conversion apparatus are in a one-to-one correspondence with the Z second polarization combining input location areas of the polarization combining apparatus. The Z polarization combining output location areas of the polarization combining apparatus are in a one-to-one correspondence with the Z output ports of the output-end unit. In this solution, a correspondence between different locations of each apparatus and module is used, so that a light beam of an input port is deflected to a destination output port by a preset angle. In this way, M input ports correspond to Z output ports.

In an example, the $Q_N$ first deflection angles that correspond to the $N^{th}$ input port and that are determined based on the $N^{th}$ group of offset parameters in the first optical-path offset parameter set are used, so that $Q_N$ sixth light beams that are deflected and that are output from an $N^{th}$ deflection area of the first optical switching submodule correspond to $Q_N$ deflection areas in an $N^{th}$ deflection area group of the third optical switching submodule; the $Q_N$ third deflection angles that correspond to the $N^{th}$ input port and that are determined based on the $N^{th}$ group of offset parameters in the first optical-path offset parameter set are used, so that $Q_N$ sixth light beams that are deflected again and that are output from the $N^{th}$ deflection area group of the third optical switching submodule are in a one-to-one correspondence with $Q_N$ first polarization combining input location areas in the first polarization combining input location areas of the polarization combining apparatus; the $Q_N$ second deflection angles that correspond to the $N^{th}$ input port and that are determined based on the $N^{th}$ group of offset parameters in the second optical-path offset parameter set are used, so that $Q_N$ seventh light beams that are deflected and that are output from the $N^{th}$ deflection area of the second optical switching submodule correspond to $Q_N$ deflection areas in an $N^{th}$ deflection area group of the fourth optical switching submodule; and the $Q_N$ fourth deflection angles that correspond to the $N^{th}$ input port and that are determined based on the $N^{th}$ group of offset parameters in the second optical-path offset parameter set are used, so that $Q_N$ seventh light beams that are deflected again and that are output from the $N^{th}$ deflection area group of the fourth optical switching submodule are in a one-to-one correspondence with $Q_N$ second polarization combining input location areas in the second polarization combining input location areas of the polarization combining apparatus. In this solution, a deflection angle is determined based on an offset parameter, and a light beam is transmitted to different areas of each apparatus and module according to each deflection angle and a predetermined direction, so that a light beam from an input port is deflected to a destination output port by a preset angle. In this way, M input ports correspond to Z output ports.

In an example, a first collimation-lens array is disposed between the input-end unit and the polarization splitting apparatus, and a second collimation-lens array is disposed between the polarization combining apparatus and the output-end unit. In this solution, the first collimation-lens array is disposed, so that a light beam input from an input port may be collimated into a group of light beams that are approximately parallel. In this way, it is more convenient for the polarization-dependent optical beam-splitting and switching unit to deflect a direction angle of a light beam, and a method for calculating the first deflection angle, the second deflection angle, the third deflection angle, and the fourth deflection angle is simpler. The second collimation-lens array may correspondingly output a group of parallel light beams to respective output ports. An interval between the first optical beam-splitting and switching apparatus and the first collimation-lens array is set as a collimator distance of the first collimation-lens array, so that waists of light spots of a third light beam and a fifth light beam that correspond to each of the first light beams are mapped onto a surface of the first optical beam-splitting and switching apparatus. In this case, a light spot, of a light beam output from the first collimation-lens array, on the first optical beam-splitting and switching apparatus is smallest, reducing a loss caused by dispersed light beams. Similarly, an interval between the second optical switching apparatus and the second collimation-lens array is a collimator distance of the second collimation-lens array.

In an example, the first optical beam-splitting and switching apparatus is a liquid crystal on silicon LCOS.

According to a fourth aspect, a reconfigurable optical add-drop multiplexer is provided, including a wavelength selective switch WSS and at least one of the optical cross-connects according to any one of the third aspect or the feasible implementations. In the foregoing solution, the optical cross-connect has a small loss and a large quantity of output ports, so that a size of the reconfigurable optical add-drop multiplexer can be effectively reduced, and costs of the reconfigurable optical add-drop multiplexer can be reduced.

The optical cross-connect provided in the embodiments of the present invention splits, at the ratio of $1:Q_i$, the M light beams from the M input ports, and switches, to any one of the Z output ports, each of Z light beams that are obtained by splitting. Compared with the prior art in which a client-side device of a ROADM node splits, at a ratio of 1:Q, M light beams that are output from the M input ports and transmits, to Q output ports, light beams that are obtained by splitting, and each output port receives one of the light beams obtained by splitting the M light beams, in the embodiments of this application, the optical cross-connect has more output ports in a case of a same beam-splitting ratio, and has a smaller insertion loss in a case of a same quantity of output ports. This can reduce a size and costs of the optical cross-connect.

BRIEF DESCRIPTION OF DRAWINGS

To describe the technical solutions in the embodiments of this application or in the prior art more clearly, the following briefly describes the accompanying drawings required for describing the embodiments or the prior art.

DESCRIPTION OF EMBODIMENTS

The following describes the embodiments of this application with reference to accompanying drawings.

An optical cross-connect provided in the embodiments of this application is applied to an optical add-drop multiplexer, and is used as a client-side network element of the optical add-drop multiplexer to implement wavelength adding and dropping functions. The optical add-drop multiplexer is applied to an optical network that uses an optical fiber as a main transmission medium, such as a wide area network, a metropolitan area network, or a newly-built large-scale local area network; and the optical add-drop multiplexer is mainly applied to an adding node or a dropping node that needs a specific wavelength in the optical network.

Figure 1:
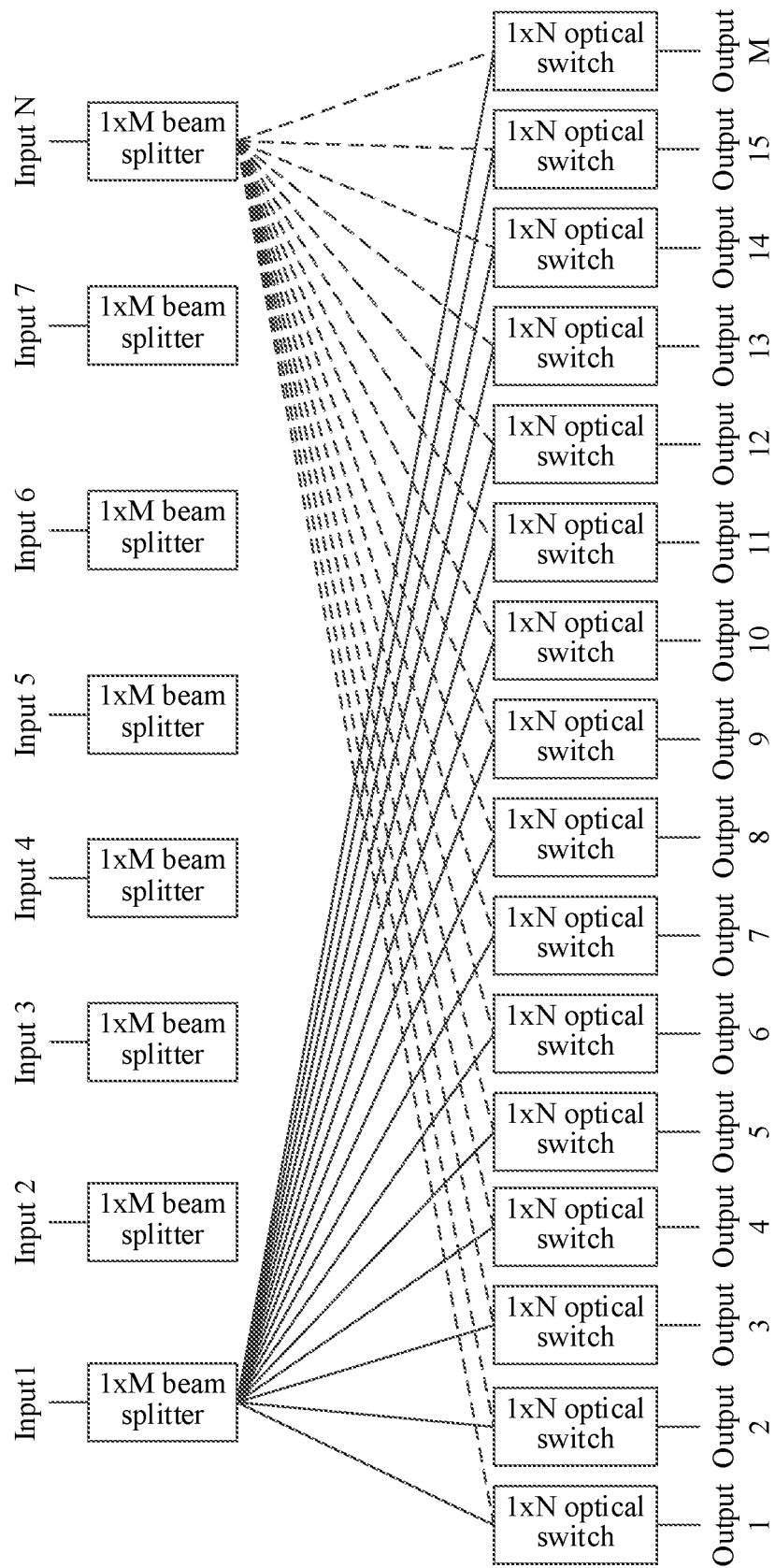
FIG. 1 is a schematic structural diagram of an MCS module in the prior art.
Figure 2:
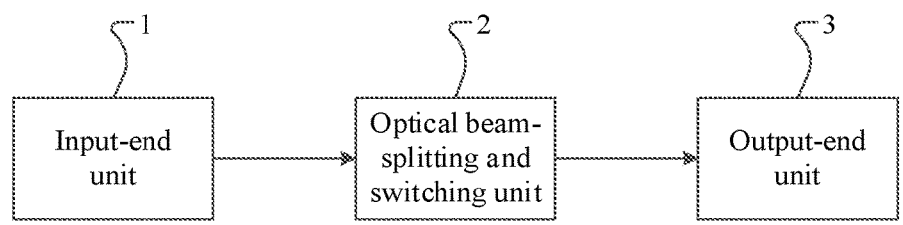
FIG. 2 is a first schematic structural diagram of an optical cross-connect according to an embodiment of this application.

As shown in FIG. 2, Embodiment 1 of this application provides an optical cross-connect. The optical cross-connect includes an input-end unit 1, an optical beam-splitting and switching unit 2, and an output-end unit 3.

The input-end unit 1 includes M input ports. Each input port receives one input light beam, and the input-end unit 1 outputs a set of first light beams including M light beams. The input-end unit 1 is configured to transmit first light beams in the set of first light beams to the optical beam-splitting and switching unit 2, and light propagation paths of the first light beams in the set of first light beams do not overlap.

A value of M is not limited in this embodiment of this application, and an arrangement manner of the M input ports is not limited, either. This does not affect achievement of an objective of this embodiment of this application. For example, the M input ports may be an optical fiber array with A rows and B columns.

The output-end unit 3 includes Z output ports, and the output-end unit 3 is configured to output a set of second light beams. Optionally, light propagation paths of the second light beams in the set of second light beams do not overlap, and one output port of the output-end unit 3 outputs one second light beam in the set of second light beams. It should be noted that, that light propagation paths of second light beams in the set of second light beams do not overlap means that light propagation paths of second light beams input into the output ports of the output-end unit 3 do not overlap, and light propagation paths of second light beams output from the output ports of the output-end unit 3 do not overlap, either.

A value of Z is not limited in this embodiment of this application, and an arrangement manner of the Z output ports is not limited, either. This does not affect achievement of an objective of this embodiment of this application. For example, the Z output ports may be an optical fiber array with C rows and D columns.

The optical beam-splitting and switching unit 2 is configured to split each first light beam in the set of first light beams into $Q_i$ second light beams, to obtain a set of second light beams including Z second light beams. The set of second light beams includes M groups of second light beams, and each group of second light beams corresponds to one first light beam and includes IQ, second light beams; and $i \in [1, M]$, $Z = Q_1 + Q_2 + \ldots + Q_M$, $Q_i \geq 1$, and at least one value of $Q_i$ is greater than or equal to 2. In other words, at least one of the M first light beams is split into at least two second light beams.

$Q_i$ second light beams obtained by splitting one first light beam may be considered as a group of second light beams. For example, $Q_i$ second light beams obtained by splitting a $1^{st}$ first light beam may be considered as a first group of second light beams, $Q_2$ second light beams obtained by splitting a $2^{nd}$ first light beam may be considered as a second group of second light beams, . . . , and $Q_M$ second light beams obtained by splitting an $M^{th}$ first light beam may be considered as an $M^{th}$ group of second light beams.

It should be noted that a group of second light beams is a concept of logically division, but is merely used to clearly and conveniently describe a relationship between the first light beam and the second light beam.

The optical beam-splitting and switching unit 2 is further configured to: perform optical path deflection on each group of second light beams in the set of second light beams based on a preset optical-path offset parameter set, and transmit, to the output-end unit 3, the second light beams that are in the set of second light beams and that are deflected. An $N^{th}$ group of offset parameters in the optical-path offset parameter set is used to perform optical path deflection on an $N^{th}$ group of second light beams in the Z second light beams, so that all second light beams in the $N^{th}$ group of second light beams are deflected and then output to $Q_N$ output ports of the output-end unit 3 in a one-to-one correspondence manner, where $N \in [1, M]$.

The preset optical-path offset parameter set includes M groups of offset parameters, and each of the M groups of offset parameters includes $Q_i$ offset parameters. That is, there are a total of $Q_1 + Q_2 + \ldots + Q_M = Z$ offset parameters.

The M groups of offset parameters are in a one-to-one correspondence with the M input ports, and an $N^{th}$ ($N \in [1, M]$) group of offset parameters is used to perform optical path deflection on the $N^{th}$ group of second light beams in the Z second light beams, so that all second light beams in the $N^{th}$ group of second light beams are deflected and then output to $Q_N$ output ports of the output-end unit 3 in a one-to-one correspondence manner.

Specifically, $Q_i$ offset parameters included in a group of offset parameters that corresponds to one input port are in a one-to-one correspondence with $Q_i$ second light beams that are obtained by splitting a first light beam corresponding to the input port, and one offset parameter corresponds to one output port. The offset parameter is used to determine, based on a location of an input port, a location of an output port, and a location of an optical beam-splitting and switching unit that correspond to each of the second light beams, a deflection angle at which the second light beam is deflected, so that the corresponding second light beam is deflected and then output to an output port corresponding to the output-end unit 3.

For example, for a specific correspondence, refer to Table 1.

TABLE 1

| Input port | Offset parameter | | | Output port |
|---|---|---|---|---|
| Input port 1 | Offset parameter group 1 | 1 | Location of the input port 1, location of an output port 2, and location of the optical beam-splitting and switching unit 2 | Output port 1 |

TABLE 1-continued

| Input port | Offset parameter | | | Output port |
|---|---|---|---|---|
| | | 2 | Location of the input port 1, location of an output port $Q_2$, and location of the optical beam-splitting and switching unit 2 | Output port 2 |
| | | ... | ... | ... |
| | | $Q_1$ | Location of the input port 1, location of an output port 1, and location of the optical beam-splitting and switching unit 2 | Output port $Q_1$ |
| Input port 2 | Offset parameter group 2 | 1 | Location of the input port 2, location of an output port $Q_1$, and location of the optical beam-splitting and switching unit 2 | Output port $Q_1$ + 1 |
| | | 2 | ... | Output port $Q_1$ + 2 |
| | | ... | ... | ... |
| | | $Q_2$ | Location of the input port 2, location of an output port Z, and location of the optical beam-splitting and switching unit 2 | Output port $Q_2$ |
| ... | ... | ... | ... | ... |
| Input port M | Offset parameter parameter group M | 1 | ... | ... |
| | | 2 | ... | ... |
| | | ... | ... | ... |
| | | $Q_M$ | Location of the input port M, location of an output port $Q_1$ + 2, and location of the optical beam-splitting and switching unit 2 | Output port Z |

It should be noted that the recording manner in Table 1 is merely an example for description, and the offset parameter group is merely a logical concept. During actual application, the entry about the offset parameter group may not be included.

The preset optical-path offset parameter set may be set on the optical beam-splitting and switching unit 2, or may be set at another location of the optical cross-connect. This is not limited in this embodiment of this application. The preset optical-path offset parameter set may be determined according to a location of an input port, a location of an output port, and the location of the optical beam-splitting and switching unit 2. When a location changes, the preset optical-path offset parameter set may be adjusted.

Table 1 is merely an example for description. A specific parameter included in each offset parameter and a specific quantity of values may be determined as required. This is not limited in this embodiment of the present invention, provided that a corresponding second light beam can be deflected based on the parameter.

In the optical cross-connect provided in this embodiment of this application, the optical beam-splitting and switching unit splits, at a ratio of $1:Q_i$, the M first light beams that are output from the M input ports, and switches, to any one of $(Q_1+Q_2+ \ldots +Q_M)$ output ports, each of $(Q_1+Q_2+ \ldots +Q_M)$ second light beams that are obtained by splitting. Compared with the prior art in which a client-side device of a ROADM node splits, at a ratio of 1:Q, M light beams that are output from the M input ports and transmits, to Q output ports, light beams that are obtained by splitting, and each output port receives one of the light beams obtained by splitting the M light beams, in this embodiment of this application, the optical cross-connect has more output ports in a case of a same beam-splitting ratio, and has a smaller insertion loss in a case of a same quantity of output ports. This can reduce a size and costs of the optical cross-connect.

Figure 3:
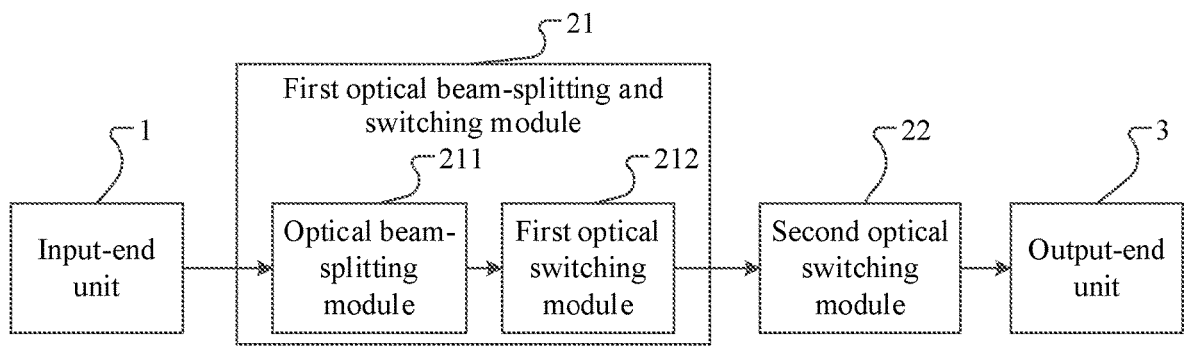
FIG. 3 is a second schematic structural diagram of an optical cross-connect according to an embodiment of this application.

It should be noted that the optical beam-splitting and switching unit separately splits, at the ratio of $1:Q_i$, the M first light beams that are output from the M input ports. For different input ports, values of $Q_i$ may be the same, or may be different. This does not affect an implementation effect of this embodiment of this application. This is not limited in this embodiment of this application. In all of the following embodiments of this application, description is provided by using an example in which $Q_1=Q_2= \ldots =Q_M=Q$ and Q>=2. With reference to FIG. 2, FIG. 3 shows another implementation of the optical cross-connect according to an embodiment of this application. The optical beam-splitting and switching unit 2 includes a first optical beam-splitting and switching module 21 and a second optical switching module 22, and the first optical beam-splitting and switching module 21 includes an optical beam-splitting module 211 and a first optical switching module 212.

The optical beam-splitting module 211 is configured to: split, into Q second light beams, a first light beam that is transmitted from each input port and that is in the set of first light beams; and transmit, to the first optical switching module 212, the Q second light beams obtained by splitting each first light beam.

The first optical switching module 212 is configured to deflect respectively, based on Q first deflection angles corresponding to each of the M input ports, direction angles of Q second light beams obtained by splitting a first light beam transmitted from the corresponding input port, so that the Q second light beams that are deflected and that correspond to each of the M input ports are separately output to the second optical switching module 22.

The second optical switching module 22 is configured to deflect, again based on Q second deflection angles corresponding to each of the M input ports, direction angles of the received Q second light beams that are deflected and that correspond to each of the M input ports, so that each second light beam that is deflected again is output to a corresponding output port of the output-end unit 3.

It should be noted that the M input ports of the input-end unit 1 may be arranged in a one-dimensional or two-dimensional manner, and the Z output ports of the output-end unit 3 may also be arranged in a one-dimensional or two-dimensional manner. After the optical beam-splitting and switching unit 2 splits a first light beam transmitted from any input port and deflects a transmission direction, deflected light beams may be output to any output port according to a preset first deflection angle and a preset second deflection angle. Directions of the input port and the output port may be parallel, or may not be parallel. The first deflection angle and the second deflection angle are angles in three-dimensional space rather than angles on a two-dimensional plane. That is, the first deflection angle and the second deflection angle each may include components in an X-axis direction, a Y-axis direction, and a Z-axis direction of a spatial coordinate system.

The optical beam-splitting module 211 includes M input areas and M output areas that are in a one-to-one correspondence with the M input areas; the M input areas of the optical beam-splitting module 211 are configured to receive respectively the M first light beams in the set of first light beams, and an $X^{th}$ output area of the optical beam-splitting module 211 is configured to output Q second light beams obtained by splitting an $X^{th}$ first light beam; and the M input areas of the optical beam-splitting module 211 are in a one-to-one correspondence with the M input ports of the input-end unit 1. The first optical switching module 212 includes M deflection areas, the second optical switching module 22 includes Z deflection areas, the Z deflection areas include M deflection area groups, and each deflection area group includes Q deflection areas. The M output areas of the optical beam-splitting module 211 are in a one-to-one correspondence with the M deflection areas of the first optical switching module 212. Further, the M deflection areas of the first optical switching module 212 are in a one-to-one correspondence with the M deflection area groups of the second optical switching module 22, and the Z deflection areas of the second optical switching module 22 are in a one-to-one correspondence with the Z output ports of the output-end unit 3. $X \in [1, M]$. It should be noted that the deflection area group is a logical division concept, and is merely used to describe a relationship between a deflection area and a second light beam, and a mutual relationship between the Q deflection areas. Locations of Q deflection areas belonging to one deflection area group may be adjacent or may not be adjacent.

One deflection area of the first optical switching module 212 corresponds to Q first deflection angles. One deflection area group of the second optical switching module 22 corresponds to Q second deflection angles. The Q first deflection angles are in a one-to-one correspondence with the Q second deflection angles.

Specifically, for any $N^{th}$ input port, the Q first deflection angles and the Q second deflection angles that correspond to the $N^{th}$ input port are determined based on an $N^{th}$ group of offset parameters in the optical-path offset parameter set. Optionally, the preset optical-path offset parameter set includes N groups of offset parameters, and each group of offset parameters includes Q offset parameters. For example, a $k^{th}$ offset parameter in a $j^{th}$ group of offset parameters in the optical-path offset parameter set may include a relative location of the input-end unit 1 relative to the first optical beam-splitting and switching module 21, a relative location of the first optical beam-splitting and switching module 21 relative to the second optical switching module 22, a relative location of the second optical switching module 22 relative to the output-end unit 3, and a relative location of a $j^{th}$ input port of the input-end unit 1 relative to a $(j \times k)^{th}$ output port of the output-end unit 3. A $(j \times k)^{th}$ first deflection angle and a $(j \times k)^{th}$ second deflection angle are determined based on the $k^{th}$ offset parameter in the $j^{th}$ group of offset parameters. $N \in [1, M]$, $j \in [1, M]$, and $k \in [1, Q]$. When the offset parameter in the optical-path offset parameter set changes, the first deflection angle and the second deflection angle that are determined based on the offset parameter change accordingly.

For example, the first optical beam-splitting and switching module 21 may be implemented by using a micro-electromechanical system (Micro-electromechanical Systems, MEMS), a digital light processor (Digital Light Processor, DLP), or a beam splitter and an optical switching unit. The second optical switching module 22 may be implemented by using an MEMS, a DLP, or an optical switching unit. This is not limited in this embodiment of this application.

Figure 5:
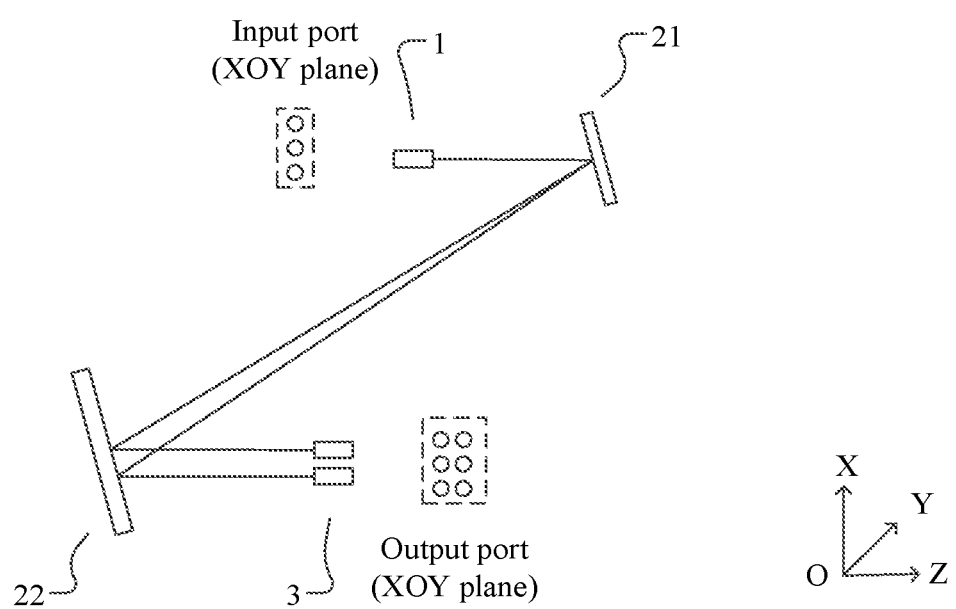
FIG. 5 is a fourth schematic structural diagram of an optical cross-connect according to an embodiment of this application.
Figure 6:
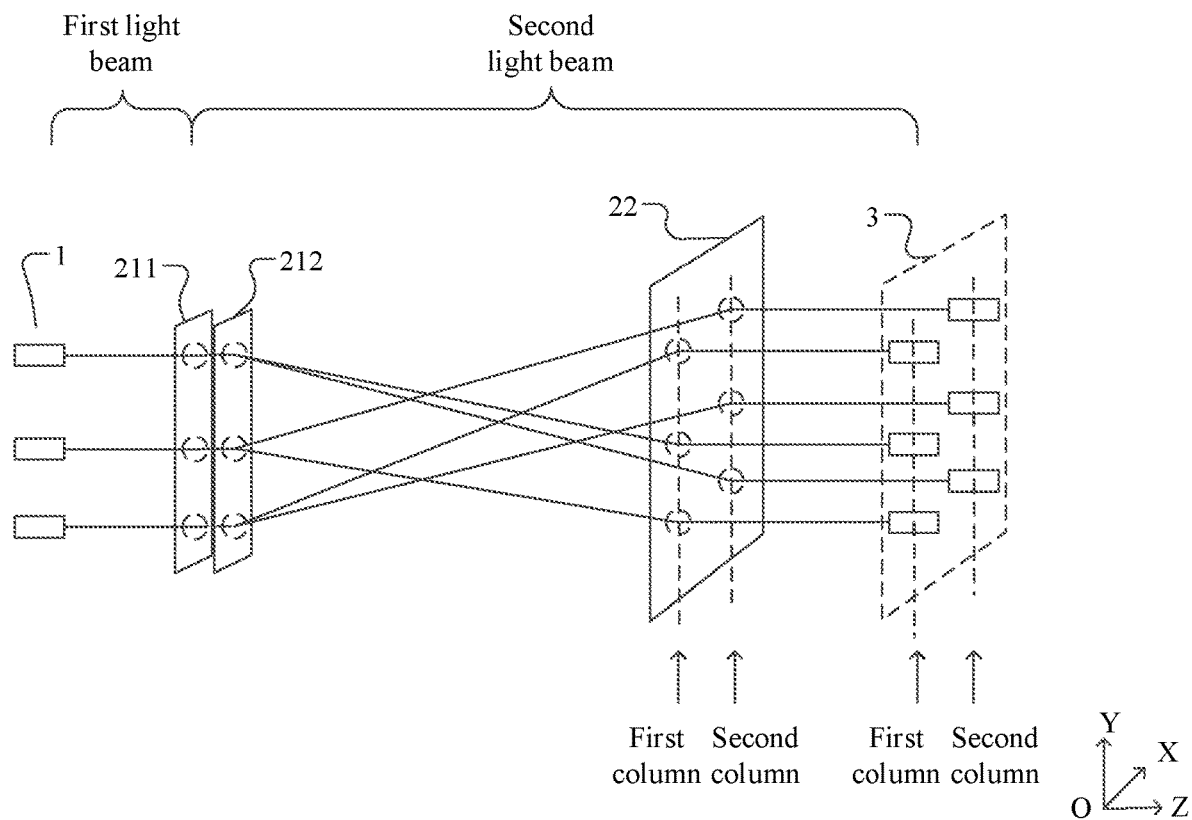
FIG. 6 is a first schematic diagram of an optical path of an optical cross-connect according to an embodiment of this application.

FIG. 5 is a schematic structural diagram of an optical cross-connect on an XOZ plane according to Embodiment 1 of this application. FIG. 6 is a schematic three-dimensional diagram of an optical path, from a perspective of a YOZ plane, of the optical cross-connect in FIG. 5 according to Embodiment 1 of this application. Referring to FIG. 5 and FIG. 6, herein, description is provided by using only an example in which the input-end unit 1 includes three (M=3) parallel optical fiber arrays, and the output-end unit 3 includes three rows and two columns of (Z=6) optical fiber arrays disposed in parallel. It should be noted that, in FIG. 6, dashed lines and circles on the optical beam-splitting module 211, the first optical switching module 212, and the second optical switching module 22 may not exist in practice, and are merely intended to better describe a transmission direction and a deflection angle of an optical path. Incident locations, of second light beams in a set of second light beams, on a surface of the second optical switching module 22 in FIG. 6 are arranged in three rows and two columns. A first column is located on a plane Y'O'Z' parallel to the YOZ plane, and a second column is located on a plane Y"O"Z" parallel to the YOZ plane.

As shown in FIG. 5 and FIG. 6, input directions of the input ports of the input-end unit 1 are set in parallel along a first direction angle, and output directions of the output ports of the output-end unit 3 are set in parallel along a second direction angle.

Each reflection area of the first optical beam-splitting and switching module 21 is located on a first plane, and a horizontal included angle and a vertical included angle between the first plane and the first direction angle are a first horizontal deviation angle and a first vertical deviation angle respectively; the first horizontal deviation angle and the first vertical deviation angle are determined based on the first direction angle, the second direction angle, and a relative location of the input-end unit 1 relative to the output-end unit 3; and a deflection action surface in each deflection area of the first optical switching module 212 is provided facing the input-end unit 1.

Each reflection area of the second optical switching module 22 is located on a second plane, a horizontal included angle and a vertical included angle between the second plane and the second direction angle are a second horizontal deviation angle and a second vertical deviation angle respectively, and the second horizontal deviation angle and the second vertical deviation angle are determined based on the first direction angle, the second direction angle, and the relative location of the input-end unit 1 relative to the output-end unit 3; and a deflection action surface of each deflection area of the second optical switching module 22 is provided facing the output-end unit 3.

It should be noted that the first direction angle and the second direction angle each indicate a direction angle in a three-dimensional coordinate system.

Optionally, the first direction angle and the second direction angle may be the same. As shown in FIG. 5, in a three-dimensional coordinate system, a direction of each input port of the input-end unit 1 may be the same as a direction of an extended optical path of a light beam corresponding to each output port of the output-end unit 3. The first direction angle and the second direction angle may alternatively be different. Correspondingly, setting of the first horizontal deviation angle and the first vertical deviation angle and setting of the second horizontal deviation angle and the second vertical deviation angle may be adjusted. For example, the second plane is disposed parallel to the first plane.

As shown in FIG. 5 and FIG. 6, three input ports of the input-end unit 1 transmit three first light beams, and the three first light beams are input to the optical beam-splitting module 211 in parallel; the optical beam-splitting module 211 splits each first light beam into two second light beams at a beam-splitting ratio of 1:2, and the first optical switching module 212 receives six second light beams (optical paths along which two second light beams obtained by splitting each first light beam are transmitted from the optical beam-splitting module 211 to the first optical switching module 212 overlap in an example in FIG. 6, and only one second light beam can be shown); the first optical switching module 212 separately deflects the six second light beams based on corresponding first deflection angles, and transmits the six deflected second light beams to the second optical switching module 22; and the second optical switching module 22 separately deflects the six deflected second light beams again based on corresponding second deflection angles, and separately transmits the six second light beams that are deflected again to the six output ports of the output-end unit 3.

It should be further noted that the optical-path diagram shown in FIG. 6 is a schematic diagram, and optical paths passing through the first optical switching module 212 and the second optical switching module 22 are actually reflected light, and are drawn in the figure by using refracted light to display a deflection relationship.

The following describes a specific implementation process of the optical beam-splitting and switching unit 2 of the optical cross-connect provided in this embodiment of this application.

Figure 7:
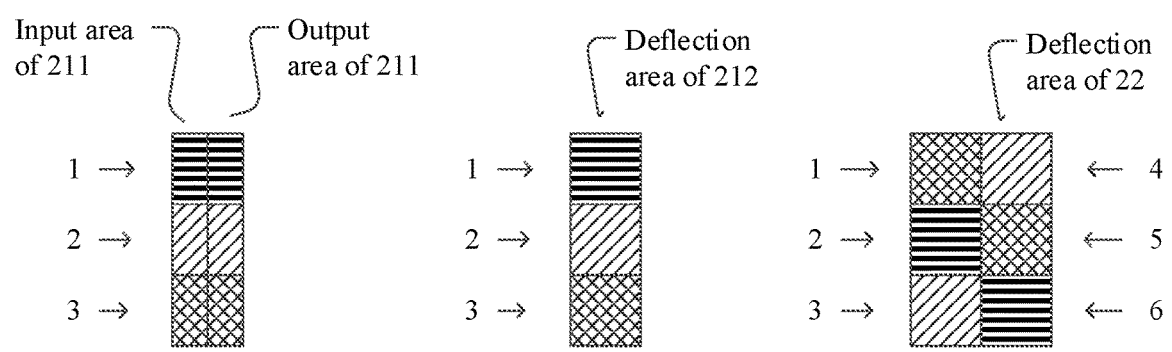
FIG. 7 is a schematic structural diagram of an optical beam-splitting and switching unit according to an embodiment of this application.

For example, FIG. 7 is a schematic diagram of an input area of the optical beam-splitting module 211, an output area of the optical beam-splitting module 211, a deflection area of the first optical switching module 212, and a deflection area of the second optical switching module 22. As shown in FIG. 7, a corresponding input-end unit 1 includes three input ports, and an output-end unit 3 includes six output ports. The optical beam-splitting module 211 includes three input areas and three output areas, the first optical switching module 212 includes three deflection areas, and the second optical switching module 22 includes six deflection areas. The second optical switching module 22 includes three deflection area groups, and each deflection area group includes two deflection areas. The three input areas of the optical beam-splitting module 211 are in a one-to-one correspondence with the three output areas, the three output areas of the optical beam-splitting module 211 are in a one-to-one correspondence with the three deflection areas of the first optical switching module 212, first and fifth deflection areas of the second optical switching module 22 are a deflection area group corresponding to a third deflection area of the first optical switching module 212, second and sixth deflection areas of the second optical switching module 22 are a deflection area group corresponding to a first deflection area of the first optical switching module 212, and third and fourth deflection areas of the second optical switching module 22 are a deflection area group corresponding to a second deflection area of the first optical switching module 212.

The following describes in detail only a propagation process of an optical path of a first light beam of one input port. A propagation process of a first light beam of another port is similar to this propagation process, and details are not described herein.

Figure 8:
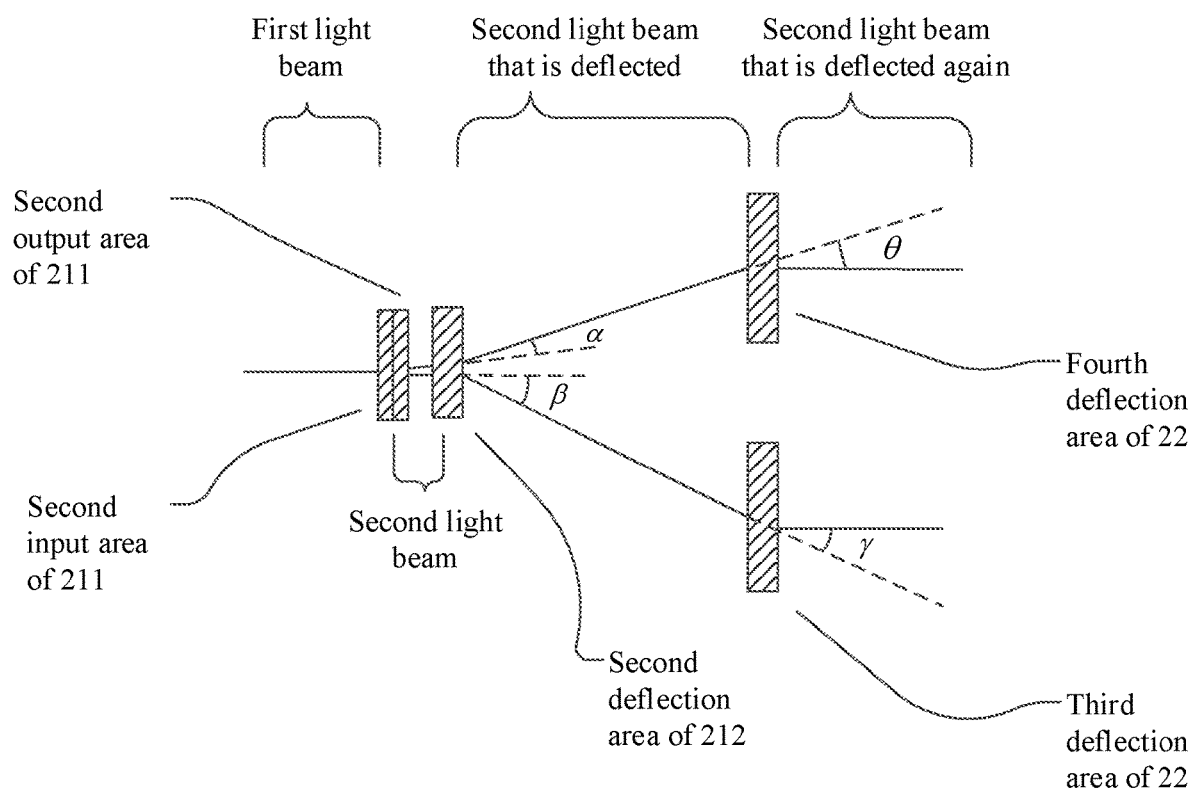
FIG. 8 is a schematic diagram of an optical path of an optical beam-splitting and switching unit according to an embodiment of this application.

For example, FIG. 8 is a schematic diagram of an optical path of a first light beam passing through an optical beam-splitting and switching unit 2. With reference to FIG. 7, as shown in FIG. 8, a first light beam transmitted from an input port of the input-end unit 1 is input to a second input area of the optical beam-splitting module 211, and two second light beams are obtained by splitting and output from a second output area of the optical beam-splitting module 211. The two second light beams are input to a second deflection area of the first optical switching module 212, the second deflection area of the first optical switching module 212 corresponds to two first deflection angles α and β; a direction angle of one second light beam is deflected by α, and the second light beam is transmitted to a fourth deflection area of the second optical switching module 22; and a direction angle of the other second light beam is deflected by β, and then the other second light beam is transmitted to a third deflection area of the second optical switching module 22. When the deflected second light beam passes through the fourth deflection area of the second optical switching module 22, the direction angle is deflected again by θ, and the second light beam that is deflected again is output. When the other deflected second light beam passes through the third deflection area of the second optical switching module 22, the direction angle is deflected again by γ, and the second light beam that is deflected again is output. θ and γ are second deflection angles, the first deflection angle α and the second deflection angle θ act on a same second light beam, and the first deflection angle β and the second deflection angle γ act on a same second light beam. Q second light beams that are deflected again are transmitted to corresponding Q output ports for output.

In this implementation, the optical beam-splitting module may be disposed to split the first light beam. Each second light beam obtained by splitting can be transmitted to a corresponding output port based on a relative location of the first optical switching module relative to the second optical switching module. This can reduce a size of the entire optical cross-connect. In addition, requirements of the input-end unit and the output-end unit on placement at different locations and at different angles can be satisfied by setting an angle between the first optical beam-splitting and switching module and the second optical switching module. This can satisfy requirements for various application environments.

Figure 4:
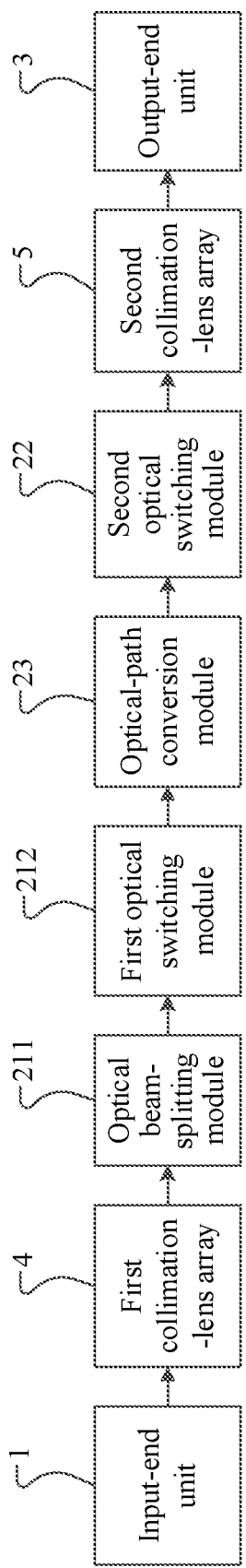
FIG. 4 is a third schematic structural diagram of an optical cross-connect according to an embodiment of this application.

With reference to FIG. 2 and FIG. 3, as shown in FIG. 4, another implementation of the optical cross-connect according to this embodiment of this application is as follows: The optical beam-splitting and switching unit 2 includes an optical-path conversion module 23, a first collimation-lens array 4 is disposed between the input-end unit 1 and the optical beam-splitting and switching unit 2, and a second collimation-lens array 5 is disposed between the optical beam-splitting and switching unit 2 and the output-end unit 3.

The optical-path conversion module 23 may be one or more lenses, and an included angle between the optical-path conversion module 23 and the first plane may be set to be equal to an included angle between the optical-path conversion module 23 and the second plane. When the first plane is parallel to the second plane, the optical-path conversion module 23 is disposed parallel to the first plane. In addition, the optical-path conversion module 23 is disposed on an optical path along which the set of second light beams is transmitted from the first optical beam-splitting and switching module 21 to the second optical switching module 23. An equivalent center of the optical-path conversion module 23 is located on a connection line between a center of the first optical beam-splitting and switching module 21 and a center of the second optical switching module 23. A center of the first optical beam-splitting and switching module 21 is a center of the M deflection areas of the first optical switching module 21, and a center of the second optical switching module 23 is a center of the Z deflection areas of the second optical switching module 23. A deflection angle of the first optical beam-splitting and switching module 21 can be fully and effectively used by disposing the optical-path conversion module 23, to be specific, by using a mapping relationship of a lens, and utilization is twice that of a system in which no optical-path conversion module is disposed on an optical path.

In an implementation, an interval between the optical-path conversion module 23 and the first optical beam-splitting and switching module 21 is set to an equivalent focal length f of the optical-path conversion module 23, and an interval between the optical-path conversion module 23 and the second optical switching module 22 is set to the equivalent focal length f of the optical-path conversion module 23. Both the interval between the optical-path conversion module 23 and the first optical beam-splitting and switching module 21 and the interval between the optical-path conversion module 23 and the second optical switching module 22 are set to f, so that a waist on a surface of the first optical beam-splitting and switching module 21 is also mapped to a location of a waist on the surface of the second optical switching module 22.

Optionally, a relationship between the equivalent focal length f of the optical-path conversion module 23, a light spot radius $\omega_1$ on the surface of the first optical beam-splitting and switching module 21, and a light spot radius $\omega_2$ on the surface of the second optical switching module 22 is $\omega_1 * \omega_2 = f * \lambda / \pi$, where $\lambda$ is a wavelength. A particular equivalent focal length f is calculated based on the radius $\omega_1$ and the light spot radius $\omega_2$, so that $\omega_1$ is equal to $\omega_2$, that is, a light spot size of a light spot on the surface of the first optical beam-splitting and switching module 21 is equal to a light spot size of a light spot on the surface of the second optical switching module 22, and an overall optical path is strictly symmetrical with the optical-path conversion module 23 as a center. This can reduce a coupling loss.

In another implementation, an interval between the first optical beam-splitting and switching module 21 and the first collimation-lens array 4 is set as a collimator distance of the first collimation-lens array 4, so that a waist of a light spot of each first light beam is mapped onto the surface of the first optical beam-splitting and switching module 21. The collimator distance of the first collimation-lens array 4 is set in this manner so that a light spot, of a light beam output from the collimation-lens array, on the first optical beam-splitting and switching module 21 is smallest, reducing a loss caused by dispersed light beams. Similarly, an interval between the second optical switching module 22 and the second collimation-lens array 5 is set as a collimator distance of the second collimation-lens array 5.

For example, a calculation manner of a collimator distance s of the first collimation-lens array 4 is:

$$\frac{1}{s} = \frac{1}{f_0} - \frac{1}{s_0} \frac{1}{1 + z_{01}^2/s_0(s_0 - f_0)},$$

where $f_0$ is a focal length of the first collimation-lens array 4, $s_0$ is a distance between an end face of an optical fiber on each input port of the input-end unit 1 and the first collimation-lens array 4, $z_{01}$ is a Rayleigh length of an optical-fiber emergent end of the input-end unit 1, and a waist distance $\omega_0$ between $z_{01}$ and the optical-fiber emergent end of the input-end unit 1 meets $$z_{01} = \frac{\pi \omega_0^2}{\lambda},$$

where $\lambda$ is a wavelength.

For example, for a calculation manner of a collimator distance s of the second collimation-lens array 5, refer to the calculation manner of the first collimation-lens array, and details are not described herein again.

Figure 9:
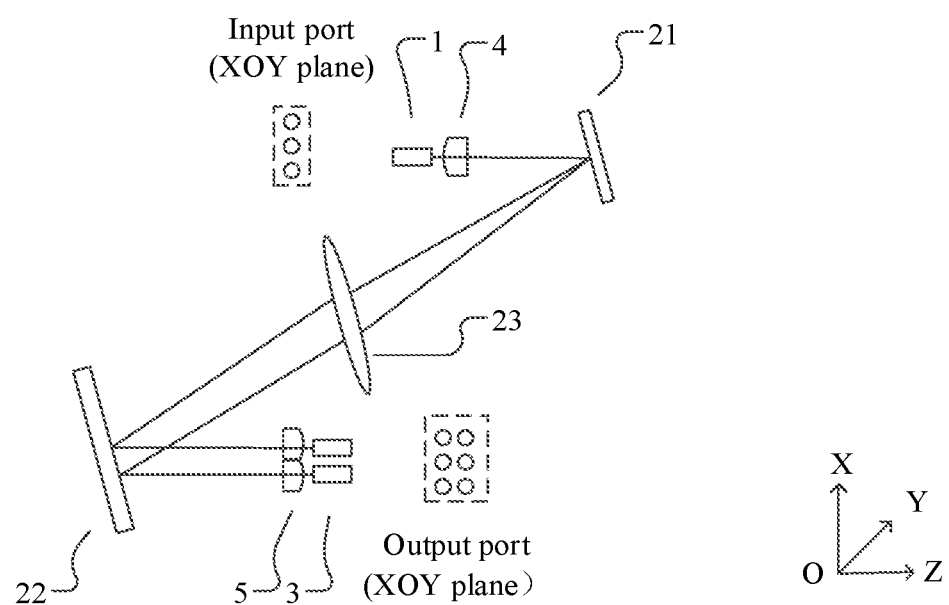
FIG. 9 is a fifth schematic structural diagram of an optical cross-connect according to an embodiment of this application.
Figure 10:
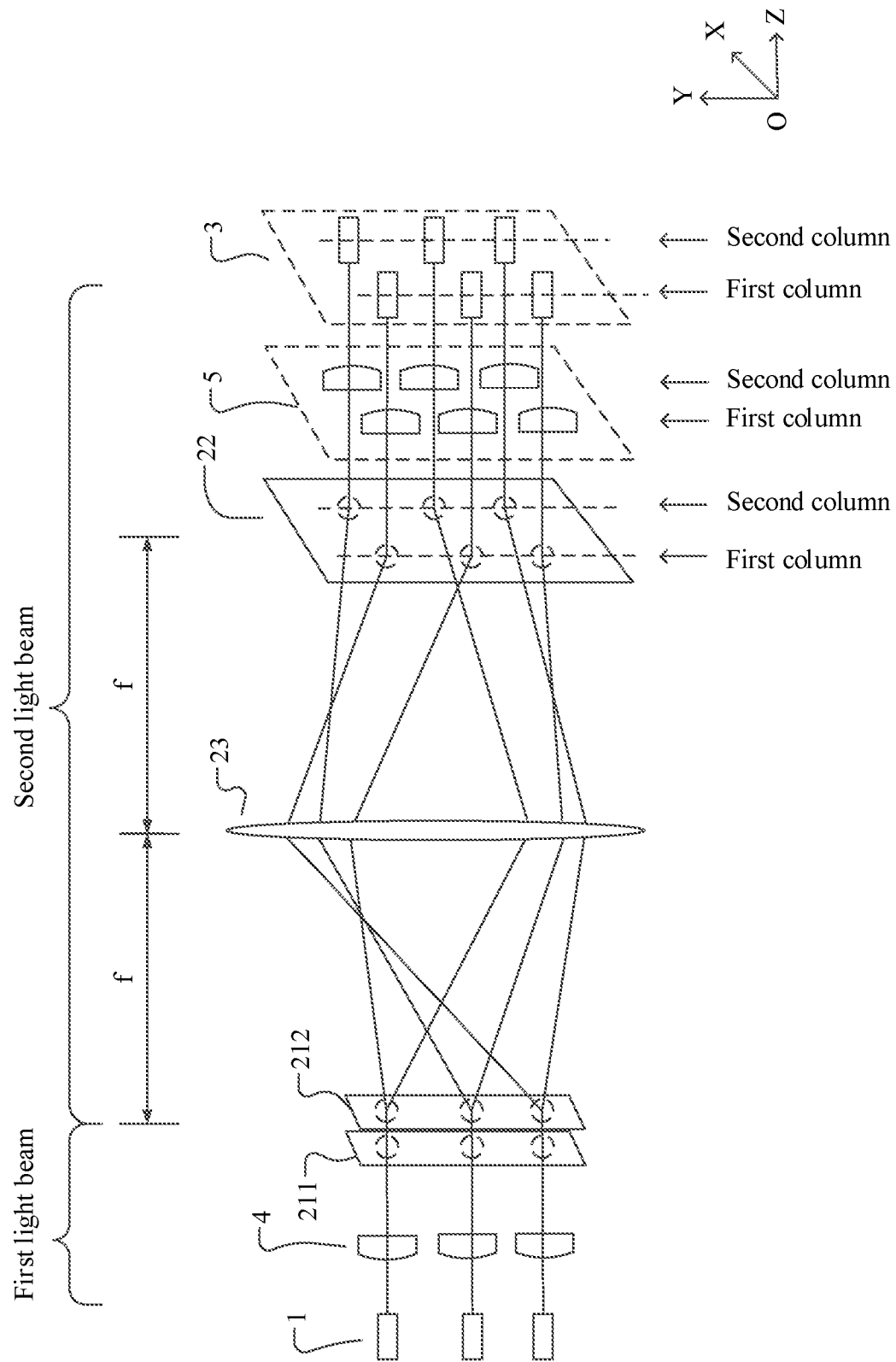
FIG. 10 is a second schematic diagram of an optical path of an optical cross-connect according to an embodiment of this application.

FIG. 9 is a schematic structural diagram of an optical cross-connect on an XOZ plane provided in this implementation. FIG. 10 is a schematic three-dimensional diagram of an optical path, from a perspective of a YOZ plane, of the optical cross-connect in FIG. 9 provided in this implementation. A difference from the optical cross-connect provided in the implementation in FIG. 5 and FIG. 6 is that the optical-path conversion module 23, the first collimation-lens array 4, and the second collimation-lens array 5 are added to the optical cross-connect provided in this implementation. Functions of the optical-path conversion module 23, the first collimation-lens array 4, and the second collimation-lens array 5 in optical-path transmission are described above, and details are not described herein again.

Figure 11:
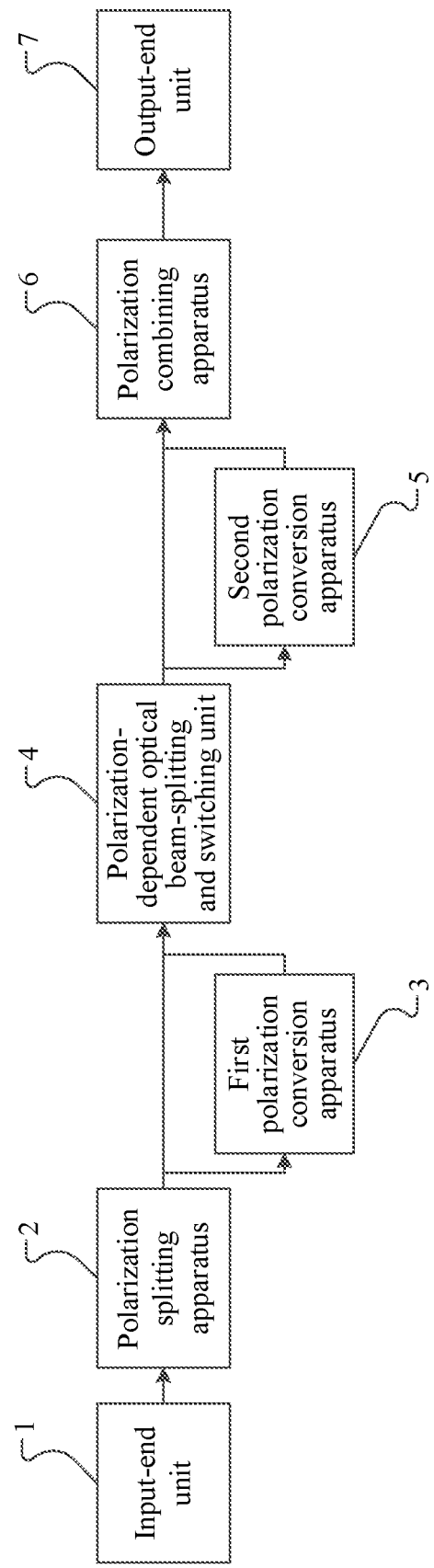
FIG. 11 is a first schematic structural diagram of another optical cross-connect according to an embodiment of this application.

As shown in FIG. 11, Embodiment 2 of this application provides an optical cross-connect. The optical cross-connect includes an input-end unit 1, a polarization splitting apparatus 2, a first polarization conversion apparatus 3, a polarization-dependent optical beam-splitting and switching unit 4, a second polarization conversion apparatus 5, a polarization combining apparatus 6, and an output-end unit 7.

In Embodiment 2 of this application, the polarization-dependent optical beam-splitting and switching unit 4 is an optical beam-splitting and switching apparatus based on polarization dependence, and may include, for example, a liquid crystal on silicon (LCOS). A light beam is split by using a holographic diffraction effect of a grating, and particular voltage is applied to a liquid crystal layer of the LCOS by using a circuit. In this way, a refractive index of the liquid crystal layer in the area can be controlled, and further a phase of a light beam input into the area can be changed, thereby controlling a direction change of the emergent light beam.

It should be noted that, in an optical transmission system, light beams carrying optical signals generally include two polarization states. Because the LCOS can process only a light beam that is in a first polarization state and is parallel to the liquid crystal layer of the LCOS, a light beam in the light beams that is in a second polarization state needs to be converted to a first polarization state, and then the LCOS processes the light beam in the first polarization state and the light beam in the polarization state obtained by converting the original second polarization state. After passing through LCOS, the light beam in the first polarization state obtained by converting the original second polarization state is restored to be in the second polarization state for transmission. Optionally, the first polarization conversion apparatus 3 and the second polarization conversion apparatus 5 that are used for converting a polarization state may use a half-wave plate.

In the optical cross-connect provided in Embodiment 2 of this application, the input-end unit 1 includes M input ports. Each input port receives one input light beam, and the input-end unit 1 outputs a set of first light beams including M light beams. The input-end unit 1 is configured to transmit first light beams in the set of first light beams to the polarization splitting apparatus 2, and light propagation paths of the first light beams in the set of first light beams do not overlap.

A value of M is not limited in this embodiment of this application, and an arrangement manner of the M input ports is not limited, either. This does not affect achievement of an objective of this embodiment of this application. For example, the M input ports may be an optical fiber array with A rows and B columns.

The output-end unit 7 includes Z output ports, and the output-end unit 7 is configured to output a set of second light beams. The set of second light beams includes Z second light beams. Optionally, light propagation paths of the second light beams in the set of second light beams do not overlap, and one output port of the output-end unit 7 outputs one second light beam in the set of second light beams.

A value of Z is not limited in this embodiment of this application, and an arrangement manner of the Z output ports is not limited, either. This does not affect achievement of an objective of this embodiment of this application. For example, the Z output ports may be an optical fiber array with C rows and D columns.

The polarization splitting apparatus 2 is configured to: perform polarization splitting on each first light beam in the set of first light beams to obtain a set of third light beams and a set of fourth light beams, where an $X^{th}$ third light beam in the set of third light beams is a light beam component that is in a first polarization state and that is of an $X^{th}$ first light beam in the set of first light beams, and an $X^{th}$ fourth light beam in the set of fourth light beams is a light beam component that is in a second polarization state and that is of the $X^{th}$ first light beam in the set of first light beams; transmit each third light beam in the set of third light beams to the polarization-dependent optical beam-splitting and switching unit 4; and transmit each fourth light beam in the set of fourth light beams to the first polarization conversion apparatus 3. $X \in [1, M]$.

For each first light beam, light paths of a third light beam and a fourth light beam obtained through polarization splitting are symmetrical along an optical path extension line of the corresponding first light beam. For example, the polarization splitting apparatus 2 may be a polarization separation crystal array or a single polarization separation crystal.

The first polarization conversion apparatus 3 is configured to: perform polarization state conversion on each fourth light beam in the set of fourth light beams to obtain a set of fifth light beams, where each fifth light beam in the set of fifth light beams is in the first polarization state; and output each fifth light beam in the set of fifth light beams to the polarization-dependent optical beam-splitting and switching unit 4.

The polarization-dependent optical beam-splitting and switching unit 4 is configured to split each third light beam in the set of third light beams into $Q_i$ sixth light beams, to obtain a set of sixth light beams, where the set of sixth light beams includes Z sixth light beams, the Z sixth light beams include M groups of sixth light beams, and each group of sixth light beams corresponds to one third light beam and includes $Q_1$ sixth light beams; and $i \in [1, M]$, $Z = Q_1 + Q_2 + \ldots + Q_M$, $Q_i \geq 1$, and at least one value of $Q_i$ is greater than or equal to 2.

The polarization-dependent optical beam-splitting and switching unit 4 is further configured to: perform optical path deflection on each group of sixth light beams in the set of sixth light beams based on a preset first optical-path offset parameter set, and transmit, to the polarization combining apparatus 6, the Z sixth light beams that are in the set of sixth light beams and that are deflected. An $N^{th}$ group of offset parameters in the first optical-path offset parameter set is used to perform optical path deflection on an $N^{th}$ group of sixth light beams in the set of sixth light beams, so that each sixth light beam in the $N^{th}$ group of sixth light beams is deflected and transmitted to the polarization combining apparatus 6. $N \in [1, M]$.

The polarization-dependent optical beam-splitting and switching unit 4 is further configured to split each fifth light beam in the set of fifth light beams into $Q_i$ seventh light beams, to obtain a set of seventh light beams, where the set of seventh light beams includes Z seventh light beams, the Z seventh light beams include M groups of seventh light beams, and each group of seventh light beams corresponds to one fifth light beam and includes $Q_i$ seventh light beams.

The polarization-dependent optical beam-splitting and switching unit 4 is further configured to: perform optical path deflection on each group of seventh light beams in the set of seventh light beams based on a preset second optical-path offset parameter set, and transmit, to the second polarization conversion apparatus 5, the Z seventh light beams that are in the set of seventh light beams and that are deflected. An $N^{th}$ group of offset parameters in the second optical-path offset parameter set is used to perform optical path deflection on an $N^{th}$ group of seventh light beams in the set of seventh light beams, so that the seventh light beams in the $N^{th}$ group of seventh light beams are transmitted to the second polarization conversion apparatus 5 in a one-to-one correspondence manner after being deflected, where $N \in [1, M]$.

The preset first optical-path offset parameter set and the preset second optical-path offset parameter set each include M groups of offset parameters, and each group of offset parameters includes $Q_i$ offset parameters. That is, the two sets each include $Q_1 + Q_2 + \ldots + Q_M = Z$ offset parameters. For functions and included content of the first optical-path offset parameter set and the second optical-path offset parameter set, refer to the description of the preset optical-path offset parameter set in Embodiment 1. Details are not described herein again.

The second polarization conversion apparatus 5 is configured to: perform polarization state conversion on the M groups of seventh light beams in the set of seventh light beams to obtain a set of eighth light beams, where each eighth light beam in the set of eighth light beams is in the second polarization state; and output each group of eighth light beams in the set of eighth light beams to the polarization combining apparatus 6.

The polarization combining apparatus 6 is configured to: perform polarization combining on the Z sixth light beams in the set of sixth light beams and Z eighth light beams in the set of eighth light beams to obtain the set of second light beams; and transmit each second light beam in the set of second light beams to the output-end unit 7.

For example, the polarization combining apparatus 6 may be a polarization separation crystal array or a single polarization separation crystal, provided that the polarization combining apparatus 6 is reversely mounted with the polarization separation crystal array or the single polarization separation crystal of the polarization splitting apparatus 2.

In the optical cross-connect provided in this embodiment of this application, the polarization splitting apparatus is disposed to split the first light beam into a third light beam in the first polarization state and a fourth light beam in the second polarization state through polarization splitting, and the first polarization conversion apparatus converts the fourth light beam into a fifth light beam in the first polarization state; the polarization-dependent optical beam-splitting and switching unit splits each third light beam and each fifth light beam at a ratio of $1:Q_i$, to obtain $(Q_1+Q_2+ \ldots +Q_M)$ sixth light beams and $(Q_1+Q_2+ \ldots +Q_M)$ seventh light beams; the second polarization conversion apparatus converts the seventh optical into an eighth light beam in the second polarization state; the polarization combining apparatus combines each sixth light beam in the set of sixth light beams and a corresponding eighth optical in the set of eighth light beams output ports into a second light beam, and transmits each second light beam in the set of second light beams to a corresponding output port in the $(Q_1+Q_2+ \ldots +Q_M)$ output ports. Compared with the prior art in which a client-side device of a ROADM node splits, at a ratio of 1:Q, M light beams that are output from the M input ports and transmits, to Q output ports, light beams that are obtained by splitting, and each output port receives one of the light beams obtained by splitting the M light beams, in this embodiment of this application, the optical cross-connect has more output ports in a case of a same beam-splitting ratio, and has a smaller insertion loss in a case of a same quantity of output ports. This can effectively improve maintainability of the ROADM node and reduce a size and costs of the optical cross-connect.

It should be noted that the polarization-dependent optical beam-splitting and switching unit separately splits each third light beam and each fifth light beam at the ratio of $1:Q_i$, for third light beams and fifth light beams that correspond to different input ports, values of $Q_i$ may be the same, or may be different. This does not affect an implementation effect of this embodiment of this application. No limitation is imposed thereon in this embodiment of this application. In all of the following embodiments of this application, description is provided by using an example in which $Q_1=Q_2=Q_M=Q$ and $Q>=2$.

Figure 12:
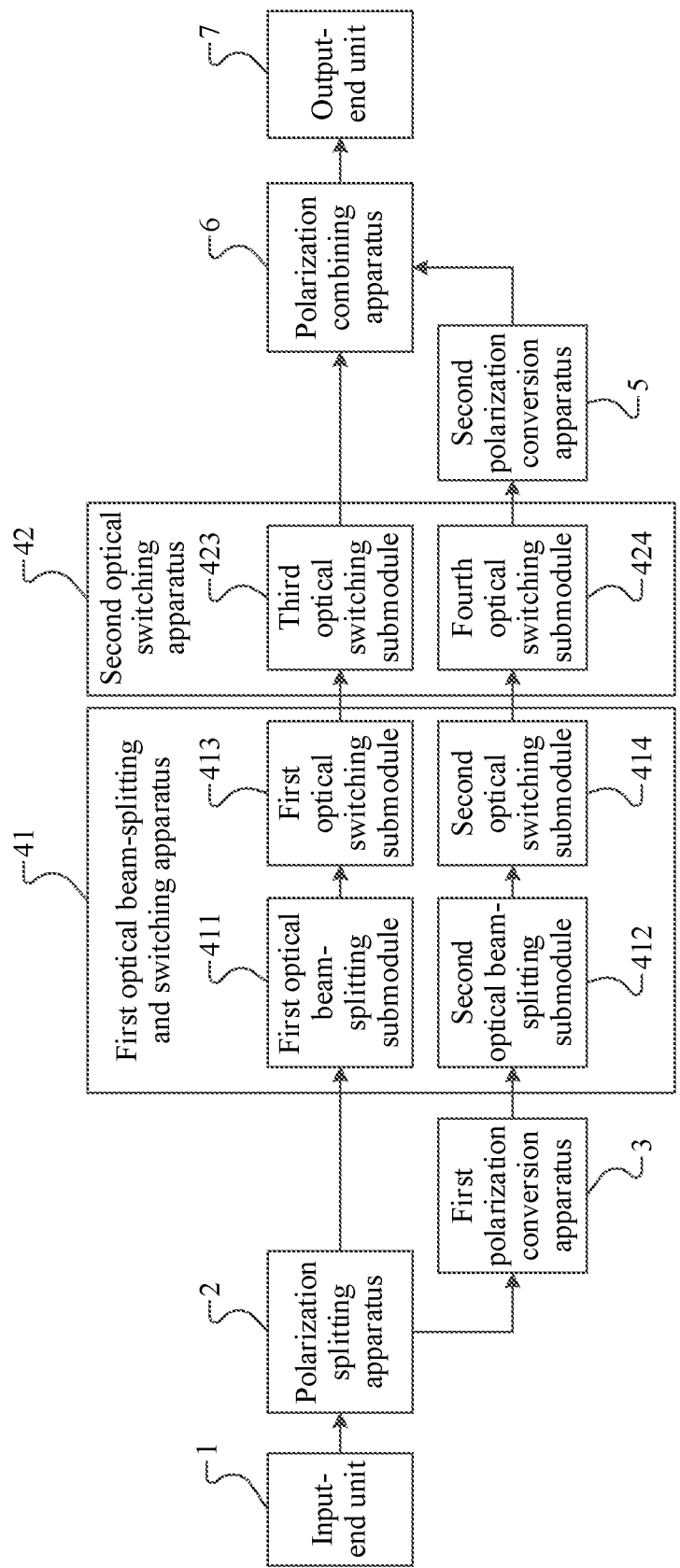
FIG. 12 is a second schematic structural diagram of another optical cross-connect according to an embodiment of this application.

With reference to FIG. 11, FIG. 12 shows another implementation of the optical cross-connect provided in Embodiment 2 of this application. The polarization-dependent optical beam-splitting and switching unit 4 includes a first optical beam-splitting and switching apparatus 41 and a second optical switching apparatus 42, the first optical beam-splitting and switching apparatus 41 includes a first optical beam-splitting submodule 411, a second optical beam-splitting submodule 412, a first optical switching submodule 413, and a second optical switching submodule 414, and the second optical switching apparatus 42 includes a third optical switching submodule 423 and a fourth optical switching submodule 424.

The first optical beam-splitting submodule 411 is configured to: split, into Q sixth light beams, each third light beam that corresponds to each input port and that is in the set of third light beams; and separately transmit, to the first optical switching submodule 413, the Q sixth light beams obtained by splitting each third light beam.

The second optical beam-splitting submodule 412 is configured to: split, into Q seventh light beams, each fifth light beam that corresponds to each input port and that is in the set of fifth light beams; and separately transmit, to the second optical switching submodule 414, Q seventh light beams obtained by splitting each fifth light beam.

The first optical switching submodule 413 is configured to: deflect respectively, based on Q first deflection angles corresponding to each of the M input ports, direction angles of Q sixth light beams obtained by splitting a third light beam corresponding to the corresponding input port, so that the Q sixth light beams that are deflected and that correspond to each of the M input ports are separately output to the third optical switching submodule 423. Q first deflection angles corresponding to one input port are in a one-to-one correspondence with the Q sixth light beams obtained by splitting the third light beam corresponding to the input port.

The second optical switching submodule 414 is configured to deflect respectively, based on Q second deflection angles corresponding to each of the M input ports, direction angles of Q seventh light beams obtained by splitting a fifth light beam corresponding to the corresponding input port, so that the Q seventh light beams that are deflected and that correspond to each of the M input ports are separately output to the fourth optical switching submodule 424. Q second deflection angles corresponding to one input port are in a one-to-one correspondence with the Q seventh light beams obtained by splitting the fifth light beam corresponding to the input port.

It should be noted that, in a process in which the second optical switching submodule 414 separately outputs the seventh light beams to the fourth optical switching submodule 424, the seventh light beam in the first polarization state actually first passes through the first polarization conversion apparatus 3, and the first polarization conversion apparatus 3 converts a polarization state of the seventh light beam to the second polarization state; and subsequently, the seventh beam in the second polarization state passes through the second polarization conversion apparatus 5, the second polarization conversion apparatus 5 converts a polarization state of each seventh beam into a first polarization state, and then the seventh beam in the first polarization state is output to the fourth optical switching submodule 424. A polarization state of the seventh light beam changes in a process of transmitting the seventh light beam from the second optical switching submodule 414 to the fourth optical switching submodule 424, but the seventh light beam is in the first polarization state when output from the second optical switching submodule 414 and input from the fourth optical switching submodule 424. When the seventh light beam is transmitted between the second optical switching submodule 414 and the fourth optical switching submodule 424, a change in the polarization state of the seventh light beam does not affect an implementation effect of optical path transmission and an implementation effect of the optical cross-connect. This process is not described in the following embodiments.

The third optical switching submodule 423 is configured to: deflect respectively, again based on Q third deflection angles corresponding to each of the M input ports, direction angles of the received Q sixth light beams that are deflected and that correspond to each of the M input ports, so that the sixth light beams that are deflected again are separately output to the polarization combining apparatus 6. Q third deflection angles corresponding to one input port are in a one-to-one correspondence with the Q sixth light beams obtained by splitting the third light beam corresponding to the input port.

The fourth optical switching submodule 424 is configured to: deflect, again based on Q fourth deflection angles corresponding to each of the M input ports, direction angles of the received Q seventh light beams that are deflected and that correspond to each of the M input ports, so that the seventh light beams that are deflected again are separately output to the second polarization conversion apparatus 5. Q fourth deflection angles corresponding to one input port are in a one-to-one correspondence with the Q seventh light beams obtained by splitting the fifth light beam corresponding to the input port.

Optionally, a first deflection angle corresponding to a $Y^{th}$ sixth light beam in Q sixth light beams obtained by splitting an $X^{th}$ third light beam is the same as a second deflection angle corresponding to a $Y^{th}$ seventh light beam in Q seventh light beams obtained by splitting an $X^{th}$ fifth light beam, and a third deflection angle corresponding to the $Y^{th}$ sixth light beam in the Q sixth light beams obtained by splitting the $X^{th}$ third light beam is the same as a fourth deflection angle corresponding to the $Y^{th}$ seventh light beam in the Q seventh light beams obtained by splitting the $X^{th}$ fifth light beam. $Y \in [1, Q]$.

It should be noted that the M input ports of the input-end unit 1 may be arranged in a one-dimensional or two-dimensional manner, and the Z output ports of the output-end unit 7 may also be arranged in a one-dimensional or two-dimensional manner. After the polarization-dependent optical beam-splitting and switching unit 4 splits a first light beam transmitted from any input port and deflects a transmission direction, the first light beam may be output to any output port based on a preset first deflection angle, a preset second deflection angle, a preset third deflection angle, and a preset fourth deflection angle. Directions of the input port and the output port may be parallel, or may not be parallel. The first deflection angle, the second deflection angle, the third deflection angle, and the fourth deflection angle are angles in three-dimensional space instead of angles in a two-dimensional plane. That is, the first deflection angle, the second deflection angle, the third deflection angle, and the fourth deflection angle each may include components in an X-axis direction, a Y-axis direction, and a Z-axis direction of a spatial coordinate system.

The polarization splitting apparatus 2 includes M polarization splitting input location areas, M first polarization splitting output location areas that are in a one-to-one correspondence with the M polarization splitting input location areas, and M second polarization splitting output location areas that are in a one-to-one correspondence with the M polarization splitting input location areas. The polarization splitting apparatus 2 is configured to: receive the M first light beams in the set of first light beams from the M polarization splitting input location areas respectively in a one-to-one correspondence manner, output M third light beams from the corresponding first polarization splitting output location areas respectively, and output M fourth light beams from the corresponding second polarization splitting output location areas respectively.

The polarization combining apparatus 6 includes Z polarization combining output location areas, Z first polarization combining input location areas that are in a one-to-one correspondence with the Z polarization combining output location areas, and Z second polarization combining input location areas that are in a one-to-one correspondence with the Z polarization combining output location areas. The polarization combining apparatus 6 is configured to: receive the Z sixth light beams in the set of sixth light beams from the Z first polarization combining input location areas respectively in a one-to-one correspondence manner, receive the Z eighth light beams in the set of eighth light beams from the Z second polarization combining input location areas respectively in a one-to-one correspondence manner, and output the Z second light beams from the corresponding Z polarization combining output location areas respectively.

The Z polarization combining output location areas of the polarization combining apparatus 6 are in a one-to-one correspondence with the Z output ports of the output-end unit 7.

The first optical beam-splitting submodule 411 includes M input areas and M output areas that are in a one-to-one correspondence with the M input areas; and the M input areas of the first optical beam-splitting submodule 411 are used to receive M third light beams respectively, and an $X^{th}$ output area of the first optical beam-splitting submodule 411 is used to output Q sixth light beams obtained by splitting the $X^{th}$ third light beam. The second optical beam-splitting submodule 412 includes M input areas and M output areas that are in a one-to-one correspondence with the M input areas; and the M input areas of the second optical beam-splitting submodule 412 are used to receive M fifth light beams respectively, and an $X^{th}$ output area of the second optical beam-splitting submodule is used to output Q seventh light beams obtained by splitting an $X^{th}$ fifth light beam, where $X \in [1, M]$.

The first polarization conversion apparatus 3 includes M conversion location areas, and the second polarization conversion apparatus 5 includes Z conversion location areas; the first optical switching submodule 413 and the second optical switching submodule 414 each include M deflection areas; and the third optical switching submodule 423 and the fourth optical switching submodule 424 each include Z deflection areas, the Z deflection areas include M deflection area groups, and each deflection area group includes Q deflection areas.

The M input areas of the first optical beam-splitting submodule 411 are in a one-to-one correspondence with the M first polarization splitting output location areas of the polarization splitting apparatus 2, the M input areas of the second optical beam-splitting submodule 412 are in a one-to-one correspondence with the M conversion location areas of the first polarization conversion apparatus 3, and the M conversion location areas of the first polarization conversion apparatus 3 are in a one-to-one correspondence with the M second polarization splitting output location areas of the polarization splitting apparatus 2. The M output areas of the first optical beam-splitting submodule 411 are in a one-to-one correspondence with the M deflection areas of the first optical switching submodule 413, and the M output areas of the second optical beam-splitting submodule 412 are in a one-to-one correspondence with the M deflection areas of the second optical switching submodule 414. The M deflection areas of the first optical switching submodule 413 are in a one-to-one correspondence with the M deflection area groups of the third optical switching submodule 423, and the M deflection areas of the second optical switching submodule 414 are in a one-to-one correspondence with the M deflection area groups of the fourth optical switching submodule 424. The Z deflection areas of the third optical switching submodule 423 are in a one-to-one correspondence with the Z first polarization combining input location areas of the polarization combining apparatus 6, the Z deflection areas of the fourth optical switching submodule 424 are in a one-to-one correspondence with the Z conversion location areas of the second polarization conversion apparatus 5, and the Z conversion location areas of the second polarization conversion apparatus 5 are in a one-to-one correspondence with the Z second polarization combining input location areas of the polarization combining apparatus 6.

Specifically, for any $N^{th}$ input port, the Q first deflection angles and the Q third deflection angles that correspond to the $N^{th}$ input port are determined based on an $N^{th}$ group of offset parameters in the first optical-path offset parameter set. The Q second deflection angles and the Q fourth deflection angles that correspond to the $N^{th}$ input port are determined based on the $N^{th}$ group of offset parameters in the second optical-path offset parameter set. Specifically, a method for determining, based on the $N^{th}$ group of offset parameters in the first optical-path offset parameter set, the Q first deflection angles and the Q third deflection angles that correspond to the $N^{th}$ input port, and a method for determining, based on the $N^{th}$ group of offset parameters in a second optical-path offset parameter set, the Q second deflection angles and the Q fourth deflection angles that correspond to the $N^{th}$ input port are the same as the method for determining, based on the $N^{th}$ group of offset parameters in the optical-path offset parameter set, the Q first deflection angles and the Q second deflection angles that correspond to the $N^{th}$ input port in Embodiment 1. Details are not described herein again.

Figure 14:
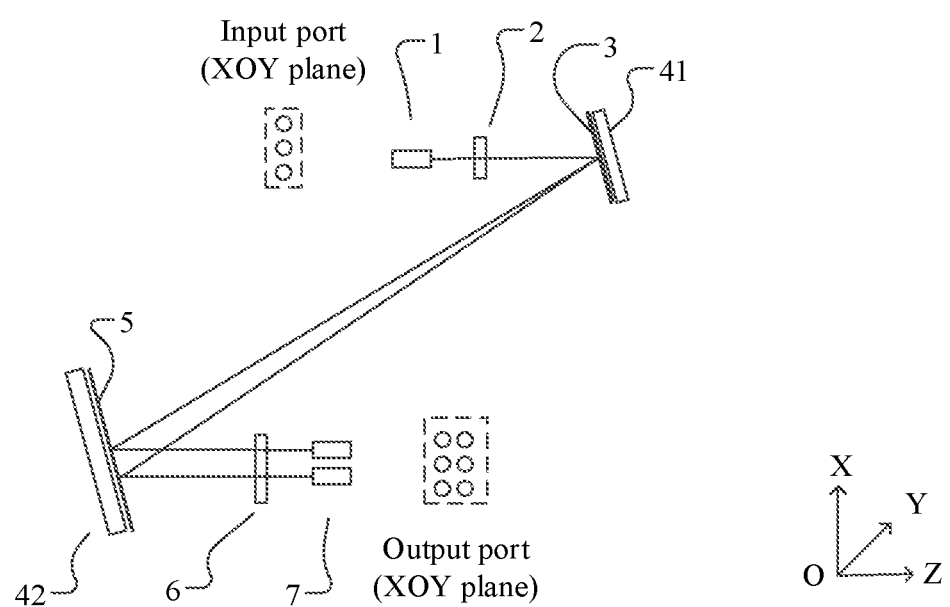
FIG. 14 is a fourth schematic structural diagram of another optical cross-connect according to an embodiment of this application.
Figure 15:
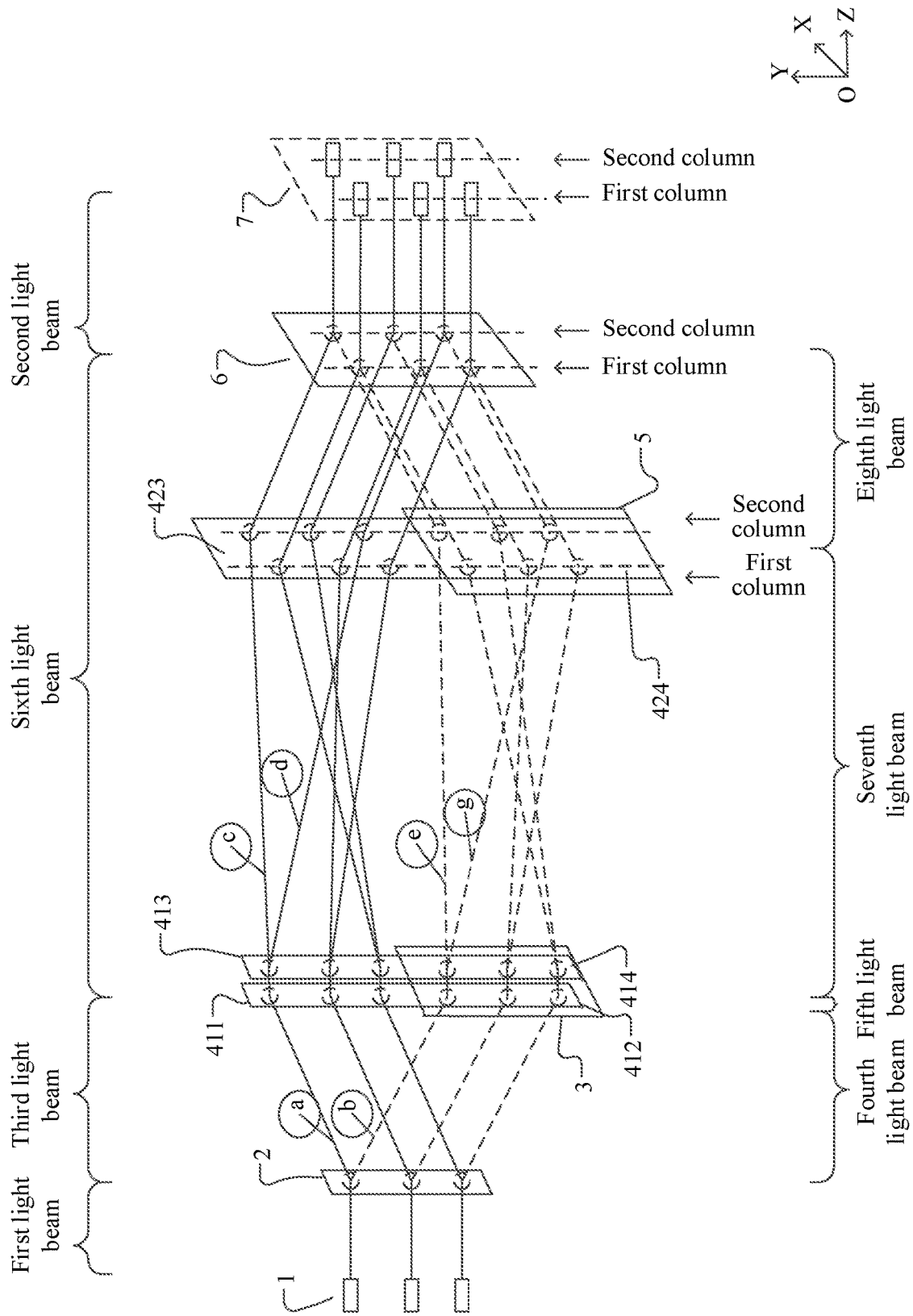
FIG. 15 is a first schematic diagram of an optical path of another optical cross-connect according to an embodiment of this application.

FIG. 14 is a schematic structural diagram of an optical cross-connect on an XOZ plane according to Embodiment 2 of this application. FIG. 15 is a schematic three-dimensional diagram of an optical path, from a perspective of a YOZ plane, of the optical cross-connect in FIG. 14 according to Embodiment 2 of this application. Referring to FIG. 14 and FIG. 15, description is provided by using only an example in which the input-end unit 1 includes three (M=3) parallel optical fiber arrays, and The output-end unit 7 includes three rows and two columns of (Z=6) optical fiber arrays that are disposed in parallel. It should be noted that, in FIG. 15, dashed lines and circles on the polarization splitting apparatus 2, the first optical beam-splitting submodule 411, the second optical beam-splitting submodule 412, the first optical switching submodule 413, the second optical switching submodule 414, the third optical switching submodule 423, the fourth optical switching submodule 424, and the polarization combining apparatus 6 may not exist in practice, and are merely intended to better describe a transmission direction and a deflection angle of an optical path. In FIG. 15, a first column is located on a Y'O'Z' plane parallel to the YOZ plane, and a second column is located on a Y"O"Z" plane parallel to the YOZ plane.

As shown in FIG. 14 and FIG. 15, manners of disposing the input-end unit 1, the output-end unit 7, the first optical beam-splitting and switching apparatus 41, and the second optical switching apparatus 42 in Embodiment 2 of this application correspond to the manners of disposing the input-end unit 1, the output-end unit 3, the first optical beam-splitting and switching module 21, and the second optical switching module 22 in Embodiment 1 of this application respectively, details are not described herein again.

The polarization splitting apparatus 2 is disposed between the input-end unit 1 and the first optical beam-splitting and switching apparatus 41, and the polarization combining apparatus 6 is disposed between the second optical switching apparatus 42 and the output-end unit 7. The first polarization conversion apparatus 3 is disposed on a side, facing the polarization splitting apparatus 2, of a surface of the second optical switching submodule 414, and the second polarization conversion apparatus 5 is disposed on a side, facing the polarization combining apparatus 6, of a surface of the fourth optical switching submodule 424.

As shown in FIG. 14 and FIG. 15, three input ports of the input-end unit 1 transmit three first light beams, and the three first light beams are input to the polarization splitting apparatus 2 in parallel; the polarization splitting apparatus 2 polarizes each first light beam into three third light beams in a first polarization state and three fourth light beams in a second polarization state, transmits the three third light beams to the first optical beam-splitting submodule 411, and transmits the three fourth light beams to the first polarization conversion apparatus 3; and the first polarization conversion apparatus 3 converts the three fourth light beams into fifth light beams in the first polarization state, and transmits the three fifth light beams to the second optical beam-splitting submodule 412.

The first optical beam-splitting submodule 411 splits each third light beam into two sixth light beams at a beam-splitting ratio of 1:2, and transmits the sixth light beams obtained by splitting to the first optical switching submodule 413; the first optical switching submodule 413 separately deflects the six sixth light beams based on corresponding first deflection angles, and transmits the six deflected sixth light beams to the third optical switching submodule 423; and the third optical switching submodule 423 separately deflects the six deflected sixth light beams based on corresponding third deflection angles, and separately transmits the six sixth light beams that are deflected again to the polarization combining apparatus 6. It should be noted that, optical paths along which two sixth light beams obtained by splitting each third light beam are transmitted from the first optical beam-splitting submodule 411 to the first optical switching submodule 413 overlap in an example in FIG. 15, and only one sixth light beam can be shown.

The second optical beam-splitting submodule 412 splits each fifth light beam into two seventh light beams at a beam-splitting ratio of 1:2, and transmits the seventh light beams obtained by splitting to the second optical switching submodule 414; the second optical switching submodule 414 separately deflects the six seventh light beams based on corresponding second deflection angles, and transmits the six deflected seventh light beams to the fourth optical switching submodule 424; and the fourth optical switching submodule 424 separately deflects the six deflected seventh light beams based on corresponding fourth deflection angles, and separately transmits, to the second polarization conversion apparatus 5, the six seventh light beams that are deflected again. The second polarization conversion apparatus 5 converts the sixth seventh light beams into six eighth light beams in a second polarization state, and separately transmits the six eighth light beams to the polarization combining apparatus 6. It should be noted that, optical paths along which two seventh light beams obtained by splitting each fifth light beam are transmitted from the second optical beam-splitting submodule 412 to the second optical switching submodule 414 overlap in an example in FIG. 15, and only one seventh light beam can be shown.

The polarization combining apparatus 6 combines the six sixth light beams and the six corresponding eighth light beams into six second light beams, and outputs the six second light beams to six output ports of the output-end unit 7.

As shown in FIG. 15, after a first light beam transmitted from a first input port of the input-end unit 1 is transmitted to the polarization splitting apparatus 2, the first light beam is split based on polarization into a third light beam a and a fourth light beam b, where the third light beam a is in a first polarization state, and the fourth light beam b is in a second polarization state; the third light beam a is transmitted to the first optical beam-splitting submodule 411, and the fourth light beam b is transmitted to the first polarization conversion apparatus 3; and after converting the fourth light beam b to the first polarization state, the first polarization conversion apparatus 3 transmits the fourth light beam b in the first polarization state to the second optical beam-splitting submodule 412.

The first optical beam-splitting submodule 411 splits the third light beam a into a sixth light beam c and a sixth light beam d, and transmits the sixth light beam c and the sixth light beam d to the first optical switching submodule 413. The first optical switching submodule 413 deflects the sixth light beam c by a first polarization angle <1> and then transmits the deflected sixth light beam c to the third optical switching submodule 423; and the third optical switching submodule 423 deflects the deflected sixth light beam c by a third deflection angle <1>, and transmits the sixth light beam c that is deflected again to the polarization combining apparatus 6. The first optical switching submodule 413 deflects the sixth light beam d by a first polarization angle <2> and then transmits the deflected sixth light beam d to the third optical switching submodule 423; and the third optical switching submodule 423 deflects the deflected sixth light beam d by a third deflection angle <2>, and transmits the sixth light beam d that is deflected again to the polarization combining apparatus 6.

The second optical beam-splitting submodule 412 splits a fifth light beam b in a first polarization state into a seventh light beam e and a seventh light beam g, and transmits the seventh light beam e and the seventh light beam g to the second optical switching submodule 414. The second optical switching submodule 414 deflects the seventh light beam e by a second polarization angle <1> and then transmits the deflected seventh light beam e to the fourth optical switching submodule 424; and the fourth optical switching submodule 424 deflects the deflected seventh light beam e by a fourth deflection angle <1>, and transmits, to the second polarization conversion apparatus 5, the seventh light beam e that is deflected again. The second optical switching submodule 414 deflects the seventh light beam g by a second polarization angle <2> and then transmits the deflected seventh light beam g to the fourth optical switching submodule 424; and the fourth optical switching submodule 424 deflects the deflected seventh light beam g by a fourth deflection angle <2>, and transmits, to the second polarization conversion apparatus 5, the seventh light beam g that is deflected again. The second polarization conversion apparatus 5 converts the seventh light beam e and the seventh light beam that are deflected again into an eighth light beam e and an eighth light beam g that are in a second polarization state, and transmits the eighth light beam e and the eighth light beam g to the polarization combining apparatus 6.

The first polarization angle <1> is the same as the second polarization angle <1>, and the first polarization angle <2> is the same as the second polarization angle <2>.

The polarization combining apparatus 6 combines the sixth light beam c and the eighth light beam e into one second light beam, and transmits the second light beam to an output port of the output-end unit 7 in a first row and a second column. The polarization combining apparatus 6 combines the sixth light beam d and the eighth light beam g into one second light beam, and transmits the second light beam to an output port of the output-end unit 7 in a third row and the second column.

It should be further noted that the optical-path diagram shown in FIG. 15 is a schematic diagram, and optical paths passing through the first optical switching submodule 413, the second optical switching submodule 414, the third optical switching submodule 423, and the fourth optical switching submodule 424 are actually reflected light, and are drawn in the figure by using refracted light to display a deflection relationship.

Specific implementations of the first optical beam-splitting submodule 411 and the second optical beam-splitting submodule 412 of the optical cross-connect provided in Embodiment 2 of this application are the same as the specific implementation of the beam-splitting module 211 of the optical cross-connect provided in Embodiment 1 of this application. Specific implementations of the first optical switching submodule 413 and the second optical switching submodule 414 of the optical cross-connect provided in Embodiment 2 of this application are the same as the specific implementation of the first optical switching module 212 of the optical cross-connect provided in Embodiment 1 of this application. Specific implementations of the third optical switching submodule 423 and the fourth optical switching submodule 424 of the optical cross-connect provided in Embodiment 2 of this application are the same as the specific implementation of the second optical switching module 22 of the optical cross-connect provided in Embodiment 1 of this application. Details are not described herein again.

In this implementation, the first optical beam-splitting submodule and the second optical beam-splitting submodule are disposed to split a light beam transmitted from an input port. Each light beam obtained by splitting can be transmitted to a corresponding output port based on a relative location of the first optical switching submodule relative to the third optical switching submodule and a relative location of the second optical switching submodule relative to the fourth optical switching submodule. This can reduce a size of the entire optical cross-connect. In addition, requirements of the input-end unit and the output-end unit on placement at different locations and at different angles can be satisfied by setting an angle between the first optical switching submodule and the third optical switching submodule and an angle between the second optical switching submodule and the fourth optical switching submodule. This can satisfy requirements for various application environments.

Figure 13A:
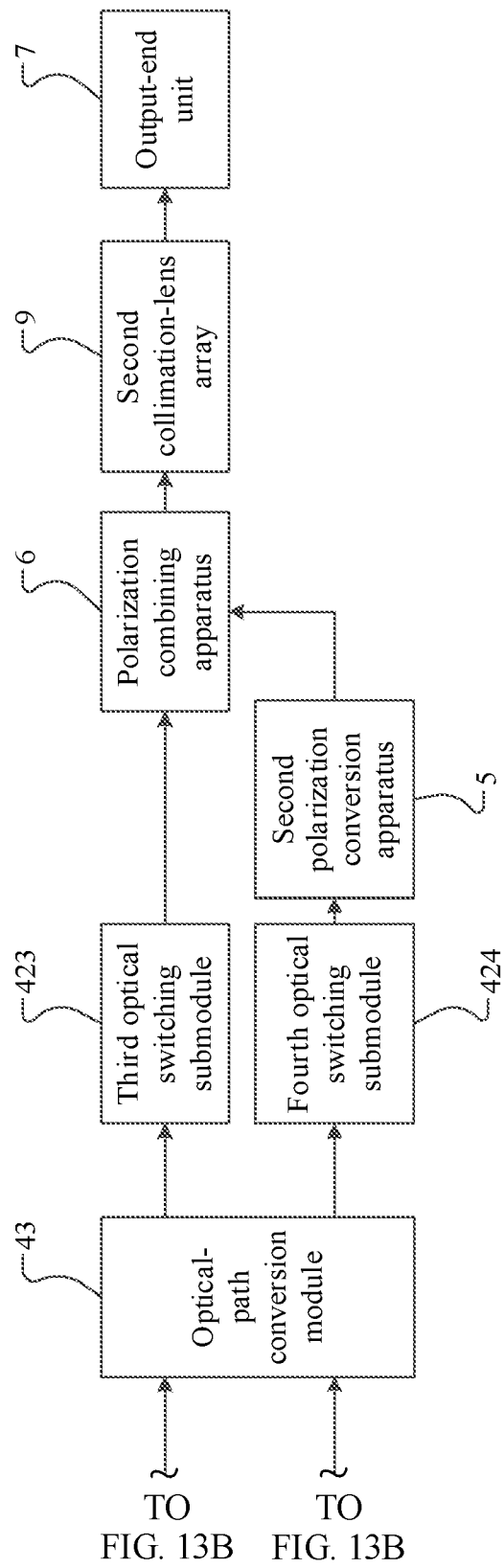
FIG. 13A and FIG. 13B are a third schematic structural diagram of another optical cross-connect according to an embodiment of this application.
Figure 13B:
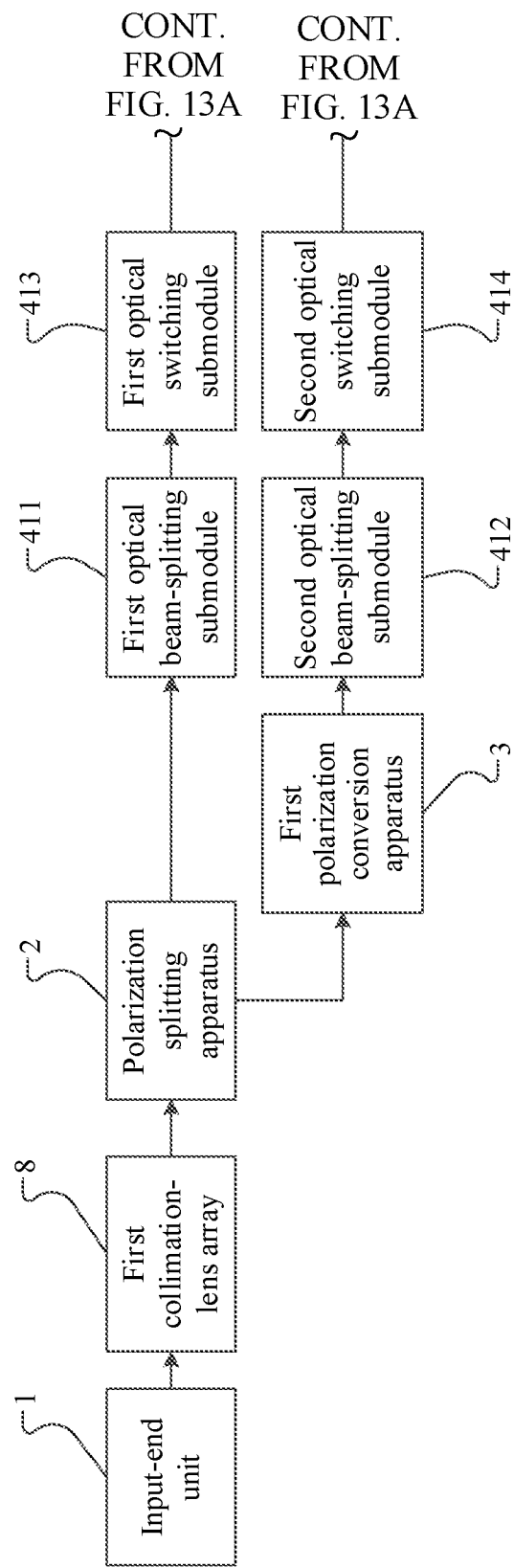

With reference to FIG. 11 and FIG. 12, as shown in FIG. 13A and FIG. 13B, another implementation of the optical cross-connect according to Embodiment 2 of this application is as follows: The polarization-dependent optical beam-splitting and switching unit 4 may further include an optical-path conversion module 43, a first collimation-lens array 8 is disposed between the input-end unit 1 and the polarization splitting apparatus 2, and a second collimation-lens array 9 is disposed between the polarization combining apparatus 6 and the output-end unit 7.

For disposing manners and functions of the optical-path conversion module 43, the first collimation-lens array 8, and the second collimation-lens array 9, refer to the description in Embodiment 1. Details are not described herein again.

In addition, an interval between the optical-path conversion module 43 and the first optical beam-splitting and switching apparatus 41 is an equivalent focal length f of the optical-path conversion module 43, an interval between the optical-path conversion module 43 and the second optical switching apparatus 42 is twice of an equivalent focal length f of the optical-path conversion module 43, an interval between the optical-path conversion module 43 and the polarization splitting apparatus 2 is twice the equivalent focal length of the optical-path conversion module 43, namely, 2f, and an interval between the optical-path conversion module 43 and the polarization combining apparatus 6 is twice the equivalent focal length of the optical-path conversion module 43, namely, 2f. This setting manner can make same light beams in different polarization states be effectively combined at a same angle as that in the case of polarization separation regardless of a deflection manner. In addition, an entire optical path is strictly symmetric by using the optical-path conversion module 43 as a center, and input and output light spots match each other, thereby reducing a coupling loss.

Figure 16:
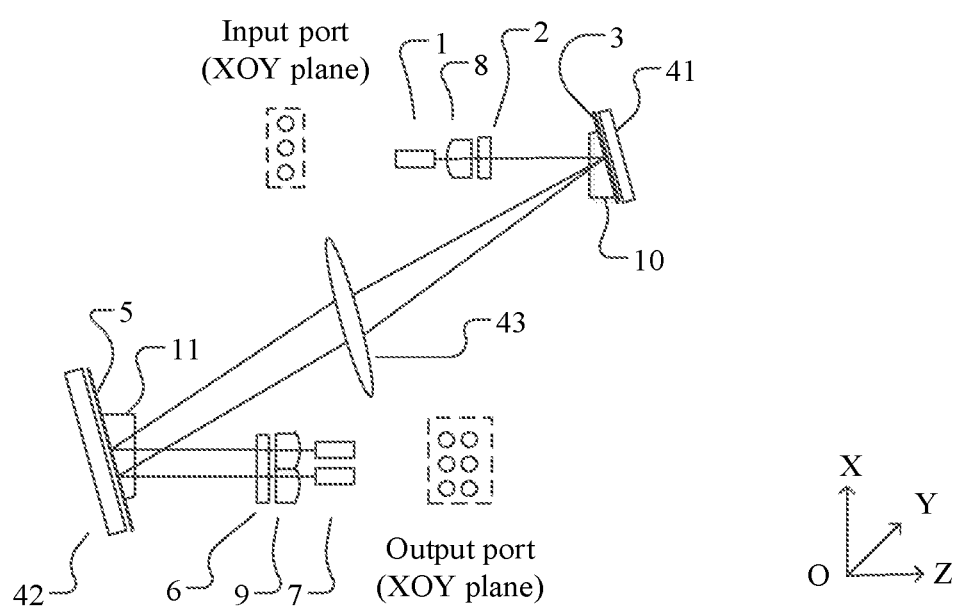
FIG. 16 is a fifth schematic structural diagram of another optical cross-connect according to an embodiment of this application.
Figure 17:
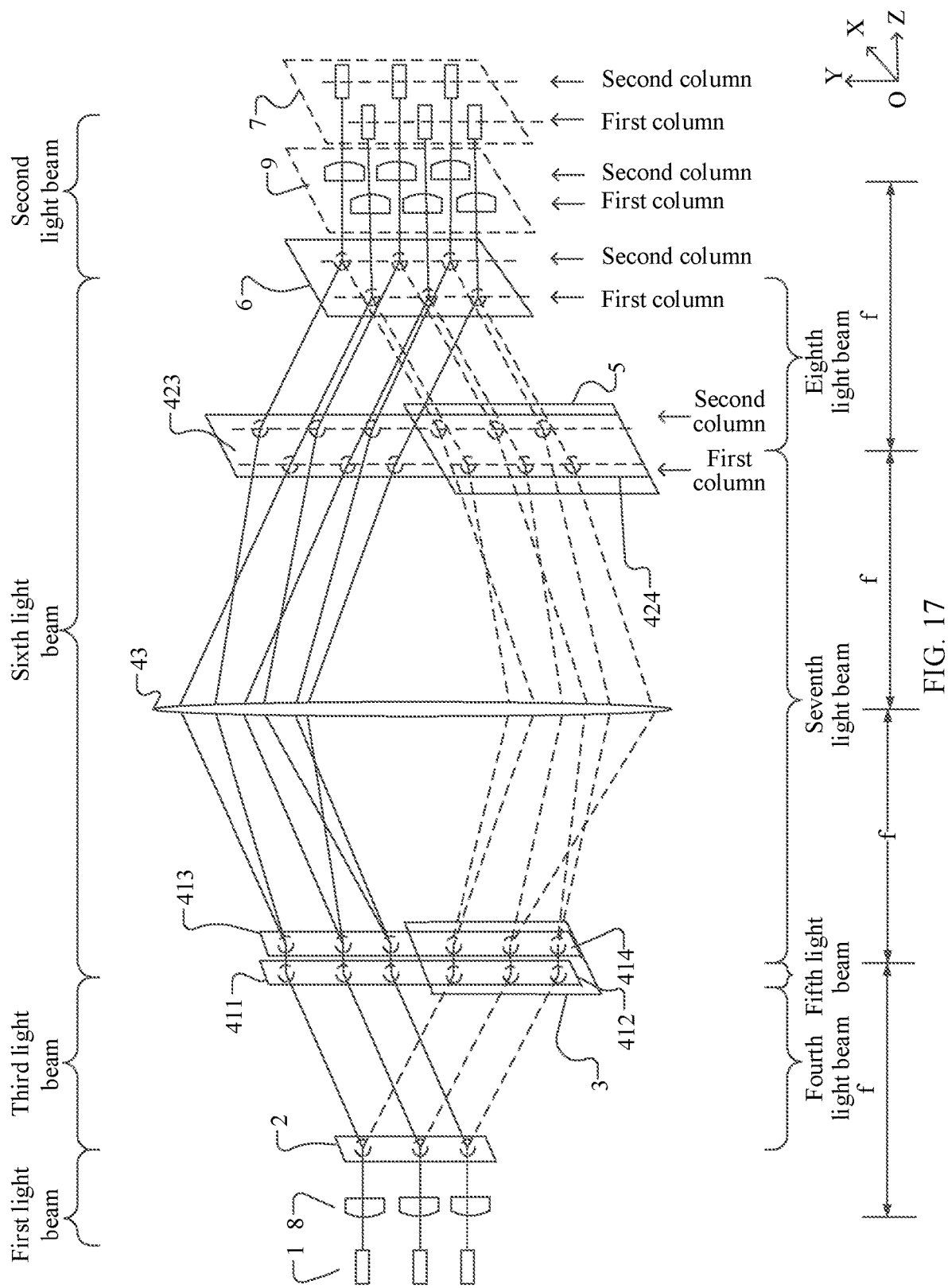
FIG. 17 is a second schematic diagram of an optical path of another optical cross-connect according to an embodiment of this application.

FIG. 16 is a schematic structural diagram of an optical cross-connect on an XOZ plane provided in this implementation. FIG. 17 is a schematic three-dimensional diagram of an optical path, from a perspective of a YOZ plane, of the optical cross-connect in FIG. 16 provided in this implementation. A difference from the optical cross-connect provided in the implementation in FIG. 14 and FIG. 15 is that the optical-path conversion module 43, the first collimation-lens array 8, and the second collimation-lens array 9 are added to the optical cross-connect provided in this implementation. Functions of the optical-path conversion module 43, the first collimation-lens array 8, and the second collimation-lens array 9 in optical-path transmission are the same as functions of the optical-path conversion module 23, the first collimation-lens array 4, and the second collimation-lens array 5 in optical path transmission in Embodiment 1, and details are not described herein again.

Optionally, as shown in FIG. 16, the optical cross-connect provided in this implementation may further include a first optical-path deflection module 10 and a second optical-path deflection module 11. For example, the first optical-path deflection module 10 and the second optical-path deflection module 11 may be prisms.

The first optical-path deflection module 10 is disposed on a side, of the surface of the first optical beam-splitting and switching apparatus 41, facing the input-end unit 1, and the second optical-path deflection module 11 is disposed on a side, of the surface of the second optical switching apparatus 42, facing the output-end unit 7. The first optical-path deflection module 10 and the second optical-path deflection module 11 are configured to deflect a transmission direction of a light beam on a plane parallel to the XOZ plane, so as to decrease an incident angle of a light beam on a surface of the first optical beam-splitting and switching apparatus 41 or the second optical switching apparatus 42, and increase diffraction efficiency obtained after the beam is deflected by the surface of the first optical beam-splitting and switching apparatus 41 or the second optical switching apparatus 42.

Figure 18:
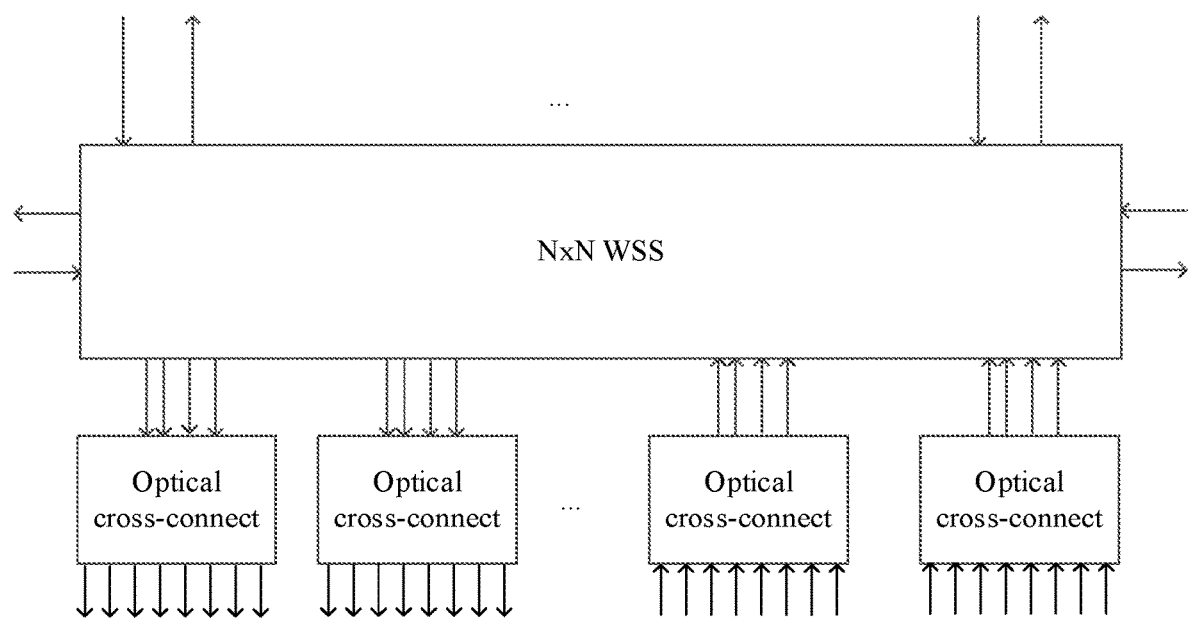
FIG. 18 is a schematic structural diagram of an optical add-drop multiplexer according to an embodiment of this application.

An embodiment of this application further provides an optical add-drop multiplexer. As shown in FIG. 18, Embodiment 3 of this application provides an optical add-drop multiplexer. The optical add/drop multiplexer includes a line side and a client side. The line side may include an N×N WSS (wavelength selective switch), or may be formed by cascading a plurality of 1×N WSSs, to implement wavelength scheduling functions in different dimensions. The client side includes the optical cross-connect provided in this embodiment of this application, and implements a wavelength adding or dropping function such as colorless, directionless, or contentionless. As shown in FIG. 18, an optical signal on a line side is input from an input port of an optical cross-connect, so that a wavelength dropping function may be implemented. An optical signal is input from an output port of the optical cross connection apparatus, so that a wavelength adding function can be implemented. In addition, a total quantity of input ports and a total quantity of output ports may be increased in a manner of cascading a plurality of optical cross-connects.

Compared with an optical add-drop multiplexer in the prior art, the optical add-drop multiplexer provided in this embodiment of this application can effectively improve maintainability of the optical add-drop multiplexer and reduce a size and costs of the optical add-drop multiplexer.

Although this application is described herein with reference to the embodiments, in a process of implementing this application that claims protection, a person skilled in the art may understand and implement another variation of the disclosed embodiments by viewing the accompanying drawings, disclosed content, and accompanying claims. In the claims, "comprising" does not exclude another component or another step, and "a" or "one" does not exclude a case of multiple. Some measures are described in dependent claims that are different from each other, but this does not mean that these measures cannot be combined to produce a better effect.

Although this application is described with reference to specific features and the embodiments thereof, it is apparent that various modifications and combinations may be made to them without departing from the spirit and scope of this application. Correspondingly, the specification and accompanying drawings are merely examples for description of this application defined by the accompanying claims, and are considered as any or all of modifications, variations, combinations, or equivalents that cover the scope of this application. Obviously, a person skilled in the art can make various modifications and variations to this application without departing from the spirit and scope of this application. This application is intended to cover these modifications and variations of this application provided that they fall within the scope of the following claims and their equivalent technologies.

What is claimed is:

1. An optical cross-connect, comprising an input-end unit, an optical beam-splitting and switching unit, and an output-end unit, wherein the input-end unit comprises M input ports, the input-end unit is configured to transmit M first light beams in a set of first light beams to the optical beam-splitting and switching unit, and light propagation paths of the M first light beams do not overlap;

the optical beam-splitting and switching unit is configured to split each first light beam in the set of first light beams into $Q_i$ second light beams, to obtain a set of second light beams, wherein the set of second light beams comprises Z second light beams, the Z second light beams comprise M groups of second light beams, and each group of second light beams corresponds to one first light beam and comprises $Q_i$ second light beams; and i∈[1, M], $Z=Q_1+Q_2+\ldots+Q_M$, $Q_i>=1$, and at least one value of $Q_i$ is greater than or equal to 2;

the optical beam-splitting and switching unit is further configured to: perform optical path deflection on each group of second light beams based on a preset optical-path offset parameter set, and transmit, to the output-end unit, the deflected second light beams, wherein an $i^{th}$ group of offset parameters in the optical-path offset parameter set is used to perform optical path deflection on the $i^{th}$ group of second light beams, so that all second light beams in the $i^{th}$ group of second light beams are deflected and then output to $Q_j$ output ports of the output-end unit in a one-to-one correspondence manner, wherein $j \in [1, M]$; and the output-end unit comprises Z output ports, and the output-end unit is configured to output the Z second light beams.

2. The optical cross-connect according to claim 1, wherein the optical beam-splitting and switching unit comprises a first optical beam-splitting and switching module and a second optical switching module, and the first optical beam-splitting and switching module comprises an optical beam-splitting module and a first optical switching module, wherein the optical beam-splitting module is configured to: split, into $Q_i$ second light beams, a $i^{th}$ first light beam that is received from each input port and that is in the set of first light beams; and transmit, to the first optical switching module, the $Q_i$ second light beams obtained by splitting each first light beam;

the first optical switching module is configured to deflect respectively, based on $Q_i$ first deflection angles corresponding to the $i^{th}$ input port of the M input ports, direction angles of $Q_i$ second light beams, so that the $Q_i$ second light beams that are deflected and that correspond to the $i^{th}$ input port of the M input ports are separately output to the second optical switching module, wherein $Q_i$ first deflection angles corresponding to one input port are in a one-to-one correspondence with the $Q_i$ second light beams obtained by splitting the first light beam transmitted from the input port; and the second optical switching module is configured to deflect, based on $Q_i$ second deflection angles corresponding to the $i^{th}$ input port of the M input ports, direction angles of the received $Q_i$ second light beams that are deflected once and each second light beam that is deflected again is output to a corresponding output port of the output-end unit; wherein for any $i^{th}$ input port, the $Q_i$ first deflection angles and the $Q_i$ second deflection angles that correspond to the $i^{th}$ input port are determined based on an $i^{th}$ group of offset parameters in the optical-path offset parameter set, wherein $i \in [1, M]$.

3. The optical cross-connect according to claim 2, wherein the optical beam-splitting module comprises M input areas and M output areas that are in a one-to-one correspondence with the M input areas; and the M input areas of the optical beam-splitting module are configured to receive respectively the M first light beams in the set of first light beams, and an $X^{th}$ output area of the optical beam-splitting module is configured to output $Q_X$ second light beams obtained by splitting an $X^{th}$ first light beam, wherein $X \in [1, M]$;

the first optical switching module comprises M deflection areas, the second optical switching module comprises Z deflection areas, the Z deflection areas comprise M deflection area groups, and each $i^{th}$ deflection area group comprises $Q_i$ deflection areas; the M output areas of the optical beam-splitting module are in a one-to-one correspondence with the M deflection areas of the first optical switching module; the M deflection areas of the first optical switching module are in a one-to-one correspondence with the M deflection area groups of the second optical switching module; and the Z deflection areas of the second optical switching module are in a one-to-one correspondence with the Z output ports of the output-end unit;

the $Q_N$ first deflection angles that correspond to the $N^{th}$ input port and that are determined based on the $N^{th}$ group of offset parameters in the optical-path offset parameter set are used, so that $Q_N$ second light beams that are deflected and that are output from the $N^{th}$ deflection area of the first optical switching module correspond to $Q_N$ deflection areas from the $N^{th}$ deflection area group of the second optical switching module; and the $Q_N$ second deflection angles that correspond to the $N^{th}$ input port and that are determined based on the $N^{th}$ group of offset parameters in the optical-path offset parameter set are used, so that the $Q_N$ second light beams that are deflected again and that are output from the $N^{th}$ deflection area group of the second optical switching module are in a one-to-one correspondence with the $Q_N$ output ports of the output-end unit.

4. The optical cross-connect according to claim 3, wherein input directions of the input ports of the input-end unit are set in parallel along a first direction angle, output directions of the output ports of the output-end unit are set in parallel along a second direction angle, and the first direction angle is the same as the second direction angle;

each reflection area of the first optical beam-splitting and switching module is located on a first plane, a horizontal included angle and a vertical included angle between the first plane and the first direction angle are a first horizontal deviation angle and a first vertical deviation angle respectively, and the first horizontal deviation angle and the first vertical deviation angle are determined based on the first direction angle, the second direction angle, and a relative location of the input-end unit relative to the output-end unit; and a deflection action surface in each deflection area of the first optical switching module is provided facing the input-end unit;

each reflection area of the second optical switching module is located on a second plane, a horizontal included angle and a vertical included angle between the second plane and the second direction angle are a second horizontal deviation angle and a second vertical deviation angle respectively, and the second horizontal deviation angle and the second vertical deviation angle are determined based on the first direction angle, the second direction angle, and the relative location of the input-end unit relative to the output-end unit; and a deflection action surface of each deflection area of the second optical switching module is provided facing the output-end unit; and the second plane is parallel to the first plane.

5. The optical cross-connect according to claim 4, wherein the optical beam-splitting and switching unit further comprises an optical-path conversion module;

the optical-path conversion module comprises one or more lenses, and is disposed parallel to the first plane and on an optical path through which the set of second light beams is transmitted from the first optical beam-splitting and switching module to the second optical switching module; and an equivalent center of the optical-path conversion module is located on a connection line between a center of the first optical beam-splitting and switching module and a center of the second optical switching module, an interval between the optical-path conversion module and the first optical beam-splitting and switching module is an equivalent focal length of the optical-path conversion module, and an interval between the optical-path conversion module and the second optical switching module is an equivalent focal length of the optical-path conversion module; and the center of the first optical beam-splitting and switching module is a center of the M deflection areas of the first optical switching module, and the center of the second optical switching module is a center of the Z deflection areas of the second optical switching module.

6. The optical cross-connect according to claim 2, wherein
a first collimation-lens array is disposed between the input-end unit and the optical beam-splitting and switching unit, and a second collimation-lens array is disposed between the optical beam-splitting and switching unit and the output-end unit;
an interval between the first optical beam-splitting and switching module and the first collimation-lens array is a collimator distance of the first collimation-lens array, so that a waist of a light spot of each of the first light beams is mapped onto a surface of the first optical beam-splitting and switching module; and
an interval between the second optical switching module and the second collimation-lens array is a collimator distance of the second collimation-lens array.

7. The optical cross-connect according to claim 2, wherein the first optical beam-splitting and switching module is a micro-electromechanical system MEMS, a digital light processor DLP, or a beam splitter and an optical switching unit.

8. The optical cross-connect according to claim 1, wherein an offset parameter in the optical-path offset parameter set comprises at least one of a location of an input port, a location of an output port, and a location of an optical beam-splitting and switching unit.

9. A reconfigurable optical add-drop multiplexer, comprising a wavelength selective switch (WSS) and at least one optical cross-connect, wherein the optical cross-connect, comprising an input-end unit, an optical beam-splitting and switching unit, and an output-end unit, wherein
the input-end unit comprises M input ports, the input-end unit is configured to transmit M first light beams in a set of first light beams to the optical beam-splitting and switching unit; and light propagation paths of the M first light beams do not overlap;
the optical beam-splitting and switching unit is configured to split each first light beam in the set of first light beams into $Q_i$ second light beams, to obtain a set of second light beams, wherein the set of second light beams comprises Z second light beams, the Z second light beams comprise M groups of second light beams, and each group of second light beams corresponds to one first light beam and comprises $Q_i$ second light beams; and i∈[1, M], $Z=Q_1+Q_2+\ldots+Q_M$, $Q_i>=1$, and at least one value of $Q_i$ is greater than or equal to 2;
the optical beam-splitting and switching unit is further configured to: perform optical path deflection on each group of second light beams based on a preset optical-path offset parameter set, and transmit, to the output-end unit, the deflected second light beams, wherein an $N^{th}$ group of offset parameters in the optical-path offset parameter set is used to perform optical path deflection on the $N^{th}$ group of second light beams, so that all second light beams in the $N^{th}$ group of second light beams are deflected and then output to $Q_N$ output ports of the output-end unit in a one-to-one correspondence manner, wherein N∈[1, M]; and
the output-end unit comprises Z output ports, and the output-end unit is configured to output the second light beams.

10. An optical cross-connect, comprising: an input-end unit, a polarization splitting apparatus, a first polarization conversion apparatus, a polarization-dependent optical beam-splitting and switching unit, a second polarization conversion apparatus, a polarization combining apparatus, and an output-end unit, wherein
the input-end unit comprises M input ports, the input-end unit is configured to transmit M first light beams in a set of first light beams to the polarization splitting apparatus; and light propagation paths of the M first light beams;
the polarization splitting apparatus is configured to: perform polarization splitting on each first light beam in the set of first light beams to obtain a set of third light beams and a set of fourth light beams, wherein an $X^{th}$ third light beam in the set of third light beams is a light beam component that is in a first polarization state and that is of an $X^{th}$ first light beam in the set of first light beams, and an $X^{th}$ fourth light beam in the set of fourth light beams is a light beam component that is in a second polarization state and that is of the $X^{th}$ first light beam in the set of first light beams; transmit each third light beam in the set of third light beams to the polarization-dependent optical beam-splitting and switching unit; and transmit each fourth light beam in the set of fourth light beams to the first polarization conversion apparatus; wherein X∈[1, M];
the first polarization conversion apparatus is configured to: perform polarization state conversion on each fourth light beam in the set of fourth light beams to obtain a set of fifth light beams, wherein each fifth light beam in the set of fifth light beams is in the first polarization state;
and output each fifth light beam in the set of fifth light beams to the polarization-dependent optical beam-splitting and switching unit;
the polarization-dependent optical beam-splitting and switching unit is configured to split each third light beam in the set of third light beams into $Q_i$ sixth light beams, to obtain a set of sixth light beams, wherein the set of sixth light beams comprises Z sixth light beams, the Z sixth light beams comprise M groups of sixth light beams, and each group of sixth light beams corresponds to one third light beam and comprises $Q_i$ sixth light beams; and i∈[1, M], $Z=Q_1+Q_2+\ldots Q_M$, $Q_i>=1$, and at least one value of $Q_i$ is greater than or equal to 2;
the polarization-dependent optical beam-splitting and switching unit is further configured to: perform optical path deflection on each group of sixth light beams in the set of sixth light beams based on a preset first optical-path offset parameter set, and transmit, to the polarization combining apparatus, the Z sixth light beams that are in the set of sixth light beams and that are deflected, wherein an $N^{th}$ group of offset parameters in the first optical-path offset parameter set is used to perform optical path deflection on an $N^{th}$ group of sixth light beams in the set of sixth light beams, so that each sixth light beam in the $N^{th}$ group of sixth light beams is deflected and transmitted to the polarization combining apparatus, wherein N∈[1, M];
the polarization-dependent optical beam-splitting and switching unit is further configured to split each fifth light beam in the set of fifth light beams into $Q_i$ seventh light beams, to obtain a set of seventh light beams, wherein the set of seventh light beams comprises Z seventh light beams, the Z seventh light beams comprise M groups of seventh light beams, and each group of seventh light beams corresponds to one fifth light beam and comprises $Q_i$ seventh light beams;

the polarization-dependent optical beam-splitting and switching unit is further configured to: perform optical path deflection on each group of seventh light beams in the set of seventh light beams based on a preset second optical-path offset parameter set, and transmit, to the second polarization conversion apparatus, the Z seventh light beams that are in the set of seventh light beams and that are deflected, wherein an $N^{th}$ group of offset parameters in the second optical-path offset parameter set is used to perform optical path deflection on an $N^{th}$ group of seventh light beams in the set of seventh light beams, so that the seventh light beams in the $N^{th}$ group of seventh light beams are transmitted to the second polarization conversion apparatus in a one-to-one correspondence manner after being deflected, wherein $N \in [1, M]$;

the second polarization conversion apparatus is configured to: perform polarization state conversion on the M groups of seventh light beams in the set of seventh light beams to obtain a set of eighth light beams, wherein each eighth light beam in the set of eighth light beams is in the second polarization state; and output each group of eighth light beams in the set of eighth light beams to the polarization combining apparatus;

the polarization combining apparatus is configured to: perform polarization combining on the Z sixth light beams in the set of sixth light beams and Z eighth light beams in the set of eighth light beams to obtain the set of second light beams, and transmit each second light beam in the set of second light beams to the output-end unit, wherein the set of second light beams comprises Z second light beams; and the output-end unit comprises Z output ports, and the output-end unit is configured to output the second light beams in the set of second light beams.

11. The optical cross-connect according to claim 10, wherein the polarization-dependent optical beam-splitting and switching unit comprises a first optical beam-splitting and switching apparatus and a second optical switching apparatus, the first optical beam-splitting and switching apparatus comprises a first optical beam-splitting submodule, a second optical beam-splitting submodule, a first optical switching submodule, and a second optical switching submodule, and the second optical switching apparatus comprises a third optical switching submodule and a fourth optical switching submodule; wherein the first optical beam-splitting submodule is configured to: split, into $Q_i$ sixth light beams, each third light beam that corresponds to each input port and that is in the set of third light beams; and separately transmit, to the first optical switching submodule, the $Q_i$ sixth light beams obtained by splitting each third light beam;

the second optical beam-splitting submodule is configured to: split, into $Q_i$ seventh light beams, each fifth light beam that corresponds to each input port and that is in the set of fifth light beams; and separately transmit, to the second optical switching submodule, $Q_i$ seventh light beams obtained by splitting each fifth light beam;

the first optical switching submodule is configured to: deflect respectively, based on $Q_i$ first deflection angles corresponding to each of the M input ports, direction angles of $Q_i$ sixth light beams obtained by splitting a third light beam corresponding to the corresponding input port, so that the $Q_i$ sixth light beams that are deflected and that correspond to each of the M input ports are separately output to the third optical switching submodule, wherein $Q_i$ first deflection angles corresponding to one input port are in a one-to-one correspondence with the $Q_i$ sixth light beams obtained by splitting the third light beam corresponding to the input port;

the second optical switching submodule is configured to deflect respectively, based on $Q_i$ second deflection angles corresponding to each of the M input ports, direction angles of $Q_i$ seventh light beams obtained by splitting a fifth light beam corresponding to the corresponding input port, so that the $Q_i$ seventh light beams that are deflected and that correspond to each of the M input ports are separately output to the fourth optical switching submodule, wherein $Q_i$ second deflection angles corresponding to one input port are in a one-to-one correspondence with the $Q_i$ seventh light beams obtained by splitting the fifth light beam corresponding to the input port;

the third optical switching submodule is configured to: deflect respectively, based on $Q_i$ third deflection angles corresponding to each of the M input ports, direction angles of the received $Q_i$ sixth light beams that are deflected and that correspond to each of the M input ports, so that the sixth light beams that are deflected again are separately output to the polarization combining apparatus; and the fourth optical switching submodule is configured to: deflect, based on $Q_i$ fourth deflection angles corresponding to each of the M input ports, direction angles of the received $Q_i$ seventh light beams that are deflected and that correspond to each of the M input ports, so that the seventh light beams that are deflected again are separately output to the second polarization conversion apparatus; wherein for any $N^{th}$ input port, $Q_N$ first deflection angles and $Q_N$ third deflection angles that correspond to the $N^{th}$ input port are determined based on the $N^{th}$ group of offset parameters in the optical-path offset parameter set; and $Q_N$ second deflection angles and $Q_N$ fourth deflection angles that correspond to the $N^{th}$ input port are determined based on the $N^{th}$ group of offset parameters in the second optical-path offset parameter set.

12. The optical cross-connect according to claim 11, wherein a first deflection angle corresponding to a $Y^{th}$ sixth light beam in $Q_X$ sixth light beams obtained by splitting an $X^{th}$ third light beam is the same as a second deflection angle corresponding to a $Y^{th}$ seventh light beam in $Q_X$ seventh light beams obtained by splitting an $X^{th}$ fifth light beam, and a third deflection angle corresponding to the $Y^{th}$ sixth light beam in the $Q_X$ sixth light beams obtained by splitting the $X^{th}$ third light beam is the same as a fourth deflection angle corresponding to the $Y^{th}$ seventh light beam in the $Q_X$ seventh light beams obtained by splitting the $X^{th}$ fifth light beam; wherein $Y \in [1, Q_X]$.

13. The optical cross-connect according to claim 11, wherein the polarization splitting apparatus comprises M polarization splitting input location areas, M first polarization splitting output location areas that are in a one-to-one correspondence with the M polarization splitting input location areas, and M second polarization splitting output location areas that are in a one-to-one correspondence with the M polarization splitting input location areas, wherein the polarization splitting apparatus is configured to: receive the M first light beams in the set of first light beams from the M polarization splitting input location areas respectively in a one-to-one correspondence manner, output M third light beams from the corresponding first polarization splitting output location areas respectively, and output M fourth light beams from the corresponding second polarization splitting output location areas respectively;

the polarization combining apparatus comprises Z polarization combining output location areas, Z first polarization combining input location areas that are in a one-to-one correspondence with the Z polarization combining output location areas, and Z second polarization combining input location areas that are in a one-to-one correspondence with the Z polarization combining output location areas, wherein the polarization combining apparatus is configured to: receive the Z sixth light beams in the set of sixth light beams from the Z first polarization combining input location areas respectively in a one-to-one correspondence manner, receive the Z eighth light beams in the set of eighth light beams from the Z second polarization combining input location areas respectively in a one-to-one correspondence manner, and output the Z second light beams from the corresponding Z polarization combining output location areas respectively;

the Z polarization combining output location areas of the polarization combining apparatus are in a one-to-one correspondence with the Z output ports of the output-end unit;

the first optical beam-splitting submodule comprises M input areas and M output areas that are in a one-to-one correspondence with the M input areas; and the M input areas of the first optical beam-splitting submodule are used to receive M third light beams respectively, and an $X^{th}$ output area of the first optical beam-splitting submodule is used to output the $Q_X$ sixth light beams obtained by splitting the $X^{th}$ third light beam;

the second optical beam-splitting submodule comprises M input areas and M output areas that are in a one-to-one correspondence with the M input areas; and the M input areas of the second optical beam-splitting submodule are used to receive M fifth light beams respectively, and an $X^{th}$ output area of the second optical beam-splitting submodule is used to output $Q_X$ seventh light beams obtained by splitting an $X^{th}$ fifth light beam, wherein $X \in [1, M]$;

the first polarization conversion apparatus comprises M conversion location areas; and the second polarization conversion apparatus comprises Z conversion location areas;

the first optical switching submodule and the second optical switching submodule each comprise M deflection areas;

the third optical switching submodule and the fourth optical switching submodule each comprise Z deflection areas, the Z deflection areas comprise M deflection area groups, and each deflection area group comprises $Q_i$ deflection areas;

the M input areas of the first optical beam-splitting submodule are in a one-to-one correspondence with the M first polarization splitting output location areas of the polarization splitting apparatus, the M input areas of the second optical beam-splitting submodule are in a one-to-one correspondence with the M conversion location areas of the first polarization conversion apparatus, and the M conversion location areas of the first polarization conversion apparatus are in a one-to-one correspondence with the M second polarization splitting output location areas of the polarization splitting apparatus;

the M output areas of the first optical beam-splitting submodule are in a one-to-one correspondence with the M deflection areas of the first optical switching submodule, and the M output areas of the second optical beam-splitting submodule are in a one-to-one correspondence with the M deflection areas of the second optical switching submodule;

the M deflection areas of the first optical switching submodule are in a one-to-one correspondence with the M deflection area groups of the third optical switching submodule, and the M deflection areas of the second optical switching submodule are in a one-to-one correspondence with the M deflection area groups of the fourth optical switching submodule; and the Z deflection areas of the third optical switching submodule are in a one-to-one correspondence with the Z first polarization combining input location areas of the polarization combining apparatus, the Z deflection areas of the fourth optical switching submodule are in a one-to-one correspondence with the Z conversion location areas of the second polarization conversion apparatus, and the Z conversion location areas of the second polarization conversion apparatus are in a one-to-one correspondence with the Z second polarization combining input location areas of the polarization combining apparatus.

14. The optical cross-connect according to claim 13, wherein the $Q_N$ first deflection angles that correspond to the $N^{th}$ input port and that are determined based on the $N^{th}$ group of offset parameters in the first optical-path offset parameter set are used, so that $Q_N$ sixth light beams that are deflected and that are output from an $N^{th}$ deflection area of the first optical switching submodule correspond to $Q_N$ deflection areas in an $N^{th}$ deflection area group of the third optical switching submodule;

the $Q_N$ third deflection angles that correspond to the $N^{th}$ input port and that are determined based on the $N^{th}$ group of offset parameters in the first optical-path offset parameter set are used, so that $Q_N$ sixth light beams that are deflected again and that are output from the $N^{th}$ deflection area group of the third optical switching submodule are in a one-to-one correspondence with $Q_N$ first polarization combining input location areas in the first polarization combining input location areas of the polarization combining apparatus;

the $Q_N$ second deflection angles that correspond to the $N^{th}$ input port and that are determined based on the $N^{th}$ group of offset parameters in the second optical-path offset parameter set are used, so that $Q_N$ seventh light beams that are deflected and that are output from the $N^{th}$ deflection area of the second optical switching submodule correspond to $Q_N$ deflection areas in an $N^{th}$ deflection area group of the fourth optical switching submodule; and the $Q_N$ fourth deflection angles that correspond to the $N^{th}$ input port and that are determined based on the $N^{th}$ group of offset parameters in the second optical-path offset parameter set are used, so that $Q_N$ seventh light beams that are deflected again and that are output from the $N^{th}$ deflection area group of the fourth optical switching submodule are in a one-to-one correspondence with $Q_N$ second polarization combining input location areas in the second polarization combining input location areas of the polarization combining apparatus.

15. The optical cross-connect according to claim 11, wherein
- a first collimation-lens array is disposed between the input-end unit and the polarization splitting apparatus, and a second collimation-lens array is disposed between the polarization combining apparatus and the output-end unit;
- a distance between the first optical beam-splitting and switching apparatus and the first collimation-lens array is a collimator distance of the first collimation-lens array, so that waists of light spots of a third light beam and a fifth light beam that correspond to each of the first light beams are mapped onto a surface of the first optical beam-splitting and switching apparatus; and
- a distance between the second optical switching apparatus and the second collimation-lens array is a collimator distance of the second collimation-lens array.

16. The optical cross-connect according to claim 11, wherein the first optical beam-splitting and switching apparatus is a liquid crystal on silicon (LCOS).

* * * * *

UNITED STATES PATENT AND TRADEMARK OFFICE
CERTIFICATE OF CORRECTION

| | |
|---|---|
| PATENT NO. | : 11,953,732 B2 |
| APPLICATION NO. | : 16/990129 |
| DATED | : April 9, 2024 |
| INVENTOR(S) | : Yunfei Yan et al. |

It is certified that error appears in the above-identified patent and that said Letters Patent is hereby corrected as shown below:

In the Claims

In Column 35, Line 35, in Claim 2, delete "once" and insert -- once, --.

In Column 41, Line 49, in Claim 13, delete "X E [1," and insert -- X$\in$ [1, --.

Signed and Sealed this
Twenty-fifth Day of June, 2024

*Katherine Kelly Vidal*
Katherine Kelly Vidal
*Director of the United States Patent and Trademark Office*